(12) United States Patent
Sano

(10) Patent No.: US 9,134,470 B2
(45) Date of Patent: Sep. 15, 2015

(54) OPTICAL FILTER INCLUDING A STEP SECTION, AND ANALYTICAL INSTRUMENT AND OPTICAL APPARATUS USING THE OPTICAL FILTER

(71) Applicant: Seiko Epson Corporation, Tokyo (JP)

(72) Inventor: Akira Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/540,370

(22) Filed: Nov. 13, 2014

(65) Prior Publication Data

US 2015/0070768 A1  Mar. 12, 2015

Related U.S. Application Data

(62) Division of application No. 13/039,390, filed on Mar. 3, 2011, now Pat. No. 8,917,449.

(30) Foreign Application Priority Data

Mar. 15, 2010 (JP) ................................. 2010-058301

(51) Int. Cl.
| | |
|---|---|
| *G02B 27/00* | (2006.01) |
| *G02B 5/26* | (2006.01) |
| *G02B 6/293* | (2006.01) |
| *G02B 26/00* | (2006.01) |
| *G01J 3/26* | (2006.01) |
| *G02B 1/10* | (2015.01) |

(52) U.S. Cl.
CPC ... *G02B 5/26* (2013.01); *G01J 3/26* (2013.01); *G02B 1/10* (2013.01); *G02B 6/29361* (2013.01); *G02B 26/001* (2013.01)

(58) Field of Classification Search
USPC .................................................. 359/578, 579
See application file for complete search history.

(56) References Cited

U.S. PATENT DOCUMENTS

| | | | |
|---|---|---|---|
| 8,917,449 B2* | 12/2014 | Sano | 359/578 |
| 2005/0146241 A1* | 7/2005 | Wan | 310/309 |
| 2007/0171531 A1 | 7/2007 | Nakamura | |
| 2007/0242920 A1 | 10/2007 | Lin et al. | |

(Continued)

FOREIGN PATENT DOCUMENTS

| | | |
|---|---|---|
| JP | 11-142752 | 5/1999 |
| JP | 2001-221913 A | 8/2001 |

(Continued)

OTHER PUBLICATIONS

Extended European Search Report, Jun. 6, 2011, pp. 1-10.

*Primary Examiner* — Arnel C Lavarias
(74) *Attorney, Agent, or Firm* — Harness, Dickey & Pierce, P.L.C.

(57) ABSTRACT

An optical filter includes a first substrate, a second substrate that is opposed to the first substrate, a first reflecting section that is disposed between the first substrate and the second substrate, a second reflecting section that is disposed between the first reflection section and the second substrate, a first gap existing between the first reflecting section and the second reflecting section, a first electrode that is disposed between the first substrate and the second substrate, a second electrode that is disposed between the first electrode and the second substrate, a second gap existing between the first electrode and the second electrode, and a third electrode that is disposed between the first substrate and the second electrode. The second gap is larger than the first gap.

9 Claims, 19 Drawing Sheets

(56) References Cited

U.S. PATENT DOCUMENTS

2012/0050742 A1* 3/2012 Sano .............................. 356/416
2014/0211315 A1* 7/2014 Matsushita ................... 359/578
2014/0268345 A1* 9/2014 Sano .............................. 359/584
2015/0092275 A1* 4/2015 Hirokubo et al. ............. 359/578

FOREIGN PATENT DOCUMENTS

| JP | 2009-134028 A | 6/2009 |
| WO | WO-2005-066596 A1 | 7/2005 |
| WO | WO-2007-022326 A2 | 2/2007 |

* cited by examiner

FIG. 8

| NO | TRANS-MISSION PEAK WAVE-LENGTH | GAP | FIRST ELECTRODE ||||  SECOND ELECTRODE |||
|---|---|---|---|---|---|---|---|---|
| | | | FIRST SEGMENT ELECTRODE ||| SECOND SEGMENT ELECTRODE |||
| | | | VOLTAGE (ELECTRICAL POTENTIAL DIFFERENCE) | PERIOD | VOLTAGE VARIATION | VOLTAGE (ELECTRICAL POTENTIAL DIFFERENCE) | PERIOD | VOLTAGE VARIATION |
| 1 | $\lambda 0$ | $g0$ | 0 | — | — | $VO1$ | $TO1$ | — |
| 2 | $\lambda 1$ | $g1$ | 0 | — | — | $VO2$ | $TO2$ | $\Delta VO1$ |
| 3 | $\lambda 2$ | $g2$ | 0 | — | — | $VO3$ | $TO3$ | $\Delta VO2$ |
| 4 | $\lambda 3$ | $g3$ | 0 | — | — | $VO4$ | $TO4$ | $\Delta VO3$ |
| 5 | $\lambda 4$ | $g4$ | 0 | — | — | $VO5$ | $TO5$ | $\Delta VO4$ |
| 6 | $\lambda 5$ | $g5$ | $VI1$ | $TI1$ | — | $VO5$ | $TI1$ | — |
| 7 | $\lambda 6$ | $g6$ | $VI2$ | $TI2$ | $\Delta VI1$ | $VO5$ | $TI2$ | — |
| 8 | $\lambda 7$ | $g7$ | $VI3$ | $TI3$ | $\Delta VI2$ | $VO5$ | $TI3$ | — |
| 9 | $\lambda 8$ | $g8$ | $VI4$ | $TI4$ | $\Delta VI3$ | $VO5$ | $TI4$ | — |

(SECOND ELECTRODE=0V)

| NO | TRANSMISSION PEAK WAVELENGTH [nm] | GAP [nm] | FIRST SEGMENT ELECTRODE | | SECOND SEGMENT ELECTRODE | |
|---|---|---|---|---|---|---|
| | | | VOLTAGE [V] | VOLTAGE VARIATION [V] | VOLTAGE [V] | VOLTAGE VARIATION [V] |
| 1 | 700 | 300 | 0 | | | |
| 2 | 660 | 280 | 0 | 0 | 16.9 | 4.5 |
| 3 | 620 | 260 | 0 | 0 | 21.4 | 3.6 |
| 4 | 580 | 240 | 0 | 0 | 25 | 2.6 |
| 5 | 540 | 220 | 0 | 0 | 27.6 | 2.2 |
| 6 | 500 | 200 | 16.4 | 16.4 | 29.8 | 0 |
| 7 | 460 | 180 | 22.2 | 5.8 | 29.8 | 0 |
| 8 | 420 | 160 | 26.3 | 4.1 | 29.8 | 0 |
| 9 | 380 | 140 | 29.3 | 3.0 | 29.8 | 0 |

FIG.12

| NO | TRANSMISSION PEAK WAVELENGTH [nm] | GAP [nm] | FIRST ELECTRODE | |
|---|---|---|---|---|
| | | | VOLTAGE [V] | VOLTAGE VARIATION [V] |
| 1 | 700 | 300 | 14.3 | |
| 2 | 660 | 280 | 18.1 | 3.8 |
| 3 | 620 | 260 | 21.1 | 3.0 |
| 4 | 580 | 240 | 23.3 | 2.2 |
| 5 | 540 | 220 | 25.2 | 1.9 |
| 6 | 500 | 200 | 26.8 | 1.6 |
| 7 | 460 | 180 | 28.0 | 1.2 |
| 8 | 420 | 160 | 29.1 | 1.1 |
| 9 | 380 | 140 | 30.0 | 0.9 |

FIG.16

OPTICAL FILTER INCLUDING A STEP SECTION, AND ANALYTICAL INSTRUMENT AND OPTICAL APPARATUS USING THE OPTICAL FILTER

This is a divisional patent application of U.S. application Ser. No. 13/039,390 filed Mar. 3, 2011, which claims priority to Japanese Patent Application No. 2010-058301 filed Mar. 15, 2010, all of which are hereby expressly incorporated by reference herein in their entireties.

BACKGROUND

1. Technical Field

The present invention relates to an optical filter, an analytical instrument, an optical apparatus, and so on using the optical filter.

2. Related Art

An interference filter has been proposed that has a variable transmission wavelength (see JP-A-11-142752). As shown in FIG. 3 of JP-A-11-142752, a pair of substrates are held parallel to each other, a pair of multilayer films (reflecting films) are formed on the pair of substrates so as to be opposed to each other with a gap having a constant distance therebetween, and a pair of electrostatic drive electrodes are provided for controlling the gap. Such a variable wavelength interference filter generates electrostatic attractive force in accordance with a voltage applied to the electrostatic drive electrodes to control the gap, thereby making it possible to vary the center wavelength of a transmission light beam.

A requirement for such variable wavelength interference filters is to control the gap between the pair of reflecting films with good accuracy using an electrostatic actuator. Since the target is the wavelength of light, nanometer gap accuracy is required. In particular, a variable wavelength filter that makes it possible to perform wavelength selection in a wide band requires highly accurate gap control with a fine displacement within a limited drive voltage range while achieving large gap displacement (movable range).

SUMMARY

An advantage of some aspects of the invention is to provide an optical filter, an analytical instrument and an optical apparatus using the optical filter each capable of controlling the gap between the pair of reflecting films with accuracy using an electrostatic actuator.

According to an aspect of the invention, there is provided an optical filter including a first substrate, a second substrate opposed to the first substrate, a first reflecting film disposed on a first opposed surface of the first substrate, the first opposed surface being opposed to the second substrate, a second reflecting film disposed on a second opposed surface of the second substrate, the second opposed surface being opposed to the first substrate, and the second reflecting film being opposed to the first reflecting film, a first electrode disposed on the first opposed surface of the first substrate at a peripheral position of the first reflecting film in a plan view, and a second electrode disposed on the second opposed surface of the second substrate, and opposed to the first electrode, wherein at least one of the first opposed surface and the second opposed surface is provided with a step section, and an initial gap between the first reflecting film and the second reflecting film is formed so as to be smaller than an initial gap between the first electrode and the second electrode.

According to this aspect of the invention, the initial gap between the first reflecting film and the second reflecting film is formed so as to be smaller than the initial gap between the first electrode and the second electrode. Here, the electrostatic attractive force F can be expressed as follows.

$$F = (1/2)\in (V/G)^2 S \quad (1)$$

In Formula 1, $\in$ denotes the dielectric constant, V denotes the applied voltage, G denotes an inter-electrode gap, and S denotes the opposed electrode area.

In other words, the electrostatic attractive force F is inversely proportional to the square of the gap G (the second gap G2) between the first and second electrodes. Therefore, in the area where the gap G between the first and second electrodes is small, the variation ΔF in the electrostatic attractive force with respect to the gap variation ΔG is large, and the electrostatic attractive force F drastically varies in response to only a minute variation in the gap G, and therefore, gap control for obtaining a predetermined amount of the electrostatic attractive force F is extremely difficult. In contrast thereto, by setting the inter-electrode gap G to be larger than the gap between the first and second reflecting films as in the case of this aspect of the invention, the variation in the electrostatic attractive force F with respect to the unit variation in the inter-electrode gap can be reduced. Therefore, it becomes possible to make the level of the electrostatic force F easy to control.

According to another aspect of the invention, in the optical filter according to the above aspect of the invention, it is possible that the first opposed surface of the first substrate includes a first surface and a second surface disposed in a periphery of the first surface in the plan view, and having a step with the first surface, the first surface is provided with the first reflecting film, and the second surface is provided with the first electrode.

In other words, by providing the step to the first opposed surface of the first substrate, the initial gap between the first reflecting film and the second reflecting film can be formed so as to be smaller than the initial gap between the first electrode and the second electrode. It should be noted that in this case, since the first and second substrates are the references of a pair of opposed substrates at least one of which is movable, one having the opposed surface provided with the step can be called the first substrate, and the other provided with no step can be called the second substrate. The first substrate can be a fixed substrate or a movable substrate.

According to another aspect of the invention, in the optical filter according to the above aspect of the invention, it is possible that the first opposed surface of the first substrate includes a first surface and a second surface disposed in a periphery of the first surface in the plan view, and having a step with the first surface, the first surface is provided with the first reflecting film, the second surface is provided with the first electrode, the second opposed surface of the second substrate includes a third surface and a fourth surface disposed in a periphery of the third surface in the plan view, and having a step with the third surface, the third surface is provided with the second reflecting film, and the fourth surface is provided with the second electrode.

In other words, by providing the step to both of the first opposed surface of the first substrate and the second opposed surface of the second substrate, the initial gap between the first reflecting film and the second reflecting film can be formed so as to be smaller than the initial gap between the first electrode and the second electrode.

According to another aspect of the invention, in the optical filter according to the above aspect of the invention, it is possible that the second substrate is movably supported with respect to the first substrate, and the second substrate has an area where the second reflecting section is disposed that has a thickness larger than a thickness of an area where the second electrode is disposed.

By forming the area where the second reflecting film is formed to be a thick-wall area in such a manner as described above to be hard to deflect, it becomes possible for the second reflecting film to vary the gap while maintaining the parallelism. On this occasion, in the case of providing the step to the second substrate, it is possible to form the area where the second reflecting film is disposed to be the thick-wall area using the step. It should be noted that since the area where the second electrode is formed can be formed to be a thin-wall area, the bendability of the second substrate can be assured.

According to another aspect of the invention, in the optical filter according to the above aspect of the invention, it is possible that the first electrode is divided into K (K is an integer equal to or greater than 2) segment electrodes electrically isolated from each other, and the second electrode is a common electrode having the same electrical potential.

In this optical filter, a common voltage (e.g., a ground voltage) is applied to the second electrode disposed in the periphery of the second reflecting film in the plan view, and independent voltages are respectively applied to the K segment electrodes constituting the first electrode disposed in the periphery of the first reflecting film in the plan view, thereby varying the dimensions of the gap between the first and second reflecting films. The applied voltages are direct-current voltages. By varying the two parameters, namely the amplitude of the voltage to be applied to each of the K segment electrodes and the number of segment electrodes selected for applying the voltages out of the K segment electrodes, in such a manner as described above, the dimension of the gap between the first and second reflecting films is controlled.

It is difficult to obtain both the large gap variable range and the low sensitivity to the voltage variation due to noise or the like with the parameter of the type of voltage alone as in the case of JP-A-11-142752. By adding the parameter of the number of electrodes as in this aspect of the invention, it becomes possible to generate more fine-tuned electrostatic attractive force to thereby perform the fine gap adjustment in a larger gap variable range by applying the applied voltage range the same as in the case of controlling it by voltage alone to the individual segment electrodes.

Here, it is assumed that the maximum value of the applied voltage is Vmax, and the gap can be varied in N levels. In the case in which the first electrode is not divided into a plurality of segments, it is necessary to divide the maximum voltage Vmax into N to thereby assign the applied voltages. On this occasion, it is assumed that the minimum value of the voltage variation between the applied voltages different from each other is $\Delta V1min$. In contrast, in the present embodiment, the applied voltage to each of the K segment electrodes can be assigned by dividing the maximum voltage Vmax into averagely (N/K). On this occasion, it is assumed that the minimum value of the voltage variation between the applied voltages different from each other applied to the same segment with respect to each of the K segment electrodes is $\Delta Vkmin$. In this case, it is obvious that $\Delta V1min < \Delta Vkmin$ is true.

In other words, as a result of distributing each of the applied voltages to the K segment electrodes taking the maximum supply voltage supplied to the electrical potential difference control section as a full-scale, the minimum value $\Delta Vkmin$ of the voltage variation between the applied voltages to be applied to the same segment electrode can be made relatively large. As a comparison, compared to the minimum voltage variation $\Delta V1min$ between the applied voltages of N levels in the case of forming the first electrode as a single electrode unlike this aspect of the invention, it is obvious that $\Delta V1min < \Delta Vkmin$ is true. As described above, if the minimum voltage variation can be assured to be large, the gap variation can be reduced even when the applied voltages to the segment electrodes vary in a certain extent due to noise depending on the power supply variation, the environment, and so on. In other words, the sensitivity to noise becomes low, or the voltage sensitivity becomes lower. Thus, gap control with high accuracy becomes possible, and feedback control on the gap is not necessarily required as in JP-A-11-142752. Further, even if the feedback control is performed on the gap, since the sensitivity to noise is low, early settling can be achieved.

According to another aspect of the invention, in the optical filter according to the above aspect of the invention, it is possible that the first electrode is divided into K (K is an integer equal to or greater than 2) segment electrodes electrically isolated from each other, the second is a common electrode having the same electrical potential, the K segment electrodes include at least first and second segment electrodes respectively including ring-like electrode sections disposed so as to have a concentric ring shape with respect to a center of the first reflecting film, and the first segment electrode is disposed inner circumferential side of the second segment electrode.

According to this configuration, the first and second segment electrodes each become in an axisymmetric arrangement with respect to the vertical center line of the first and second reflecting films. Therefore, by making the gap variable drive force (the electrostatic attractive force) act symmetrically with respect to the first and second reflecting films, the first and second reflecting films vary the gap therebetween while keeping the parallelism.

According to another aspect of the invention, in the optical filter according to the above aspect of the invention, it is possible that a first lead wire is connected to the first segment electrode, the second segment electrode is provided with a first slit adapted to make the ring-like electrode section of the second segment electrode discontinuous, and the first lead wire is drawn outside the second segment electrode via the first slit.

As described above, in the case of making the first and second segment electrodes respectively have the ring-like electrode sections, a taking-out path for the first lead wire of the first segment electrode located inside can easily be assured by the first slit provided to the second segment electrode located outside.

According to another aspect of the invention, in the optical filter according to the above aspect of the invention, it is possible that the second electrode provided to the second substrate displaced with respect to the first substrate has third and fourth segment electrodes respectively including ring-like electrode sections disposed so as to have a concentric ring shape with respect to a center of the second reflecting film, the third segment electrode is opposed to the first segment electrode, the fourth segment electrode is opposed to the second segment electrode, and the third and fourth segment electrodes are electrically connected to each other.

According to this configuration, since the area of the electrode provided to the second substrate, which is movable, is reduced to a minimum, the rigidity of the second substrate is reduced, and the bendability thereof can be assured.

According to another aspect of the invention, in the optical filter according to the above aspect of the invention, it is possible that the ring-like electrode section of the fourth segment electrode is formed continuously at a position opposed to the first slit. Since the first lead wire is disposed in the first slit, it is possible to generate the electrostatic attractive force, which acts between the first lead wire having the same electrical potential as the first segment electrode located inside and the fourth segment electrode located outside, inside the first slit. As an advantage derived therefrom, if the first and second segment electrodes are driven with substantially the same voltages, for example, even electrostatic attractive force can be generated in roughly the entire circumference of the fourth segment electrode located outside.

According to another aspect of the invention, instead of the feature of the optical filter according to the above aspect of the invention, it is possible that the fourth segment electrode is provided with a second slit adapted to make the ring-like electrode section of the fourth segment electrode discontinuous at a position opposed to the first slit. According to this configuration, the electrode opposed to the first lead wire is eliminated. Therefore, it is possible to prevent unwanted electrostatic attractive force, which acts between the first lead wire having the same electric potential as the first segment electrode located inside and the fourth segment electrode located outside, from being generated in the first slit when driving the first segment electrode located inside alone, for example.

According to another aspect of the invention, in the optical filter according to the above aspect of the invention, it is possible that at least one of the first and second substrates is formed as a rectangular substrate having first and second diagonal lines. In this case, it is possible that the first lead wire extends in a first direction along the first diagonal line from the first segment electrode, a second lead wire extending in a second direction on the first diagonal line opposite to the first direction is connected to the second segment electrode, a third lead wire extending in a third direction along the second diagonal line is connected to the third and fourth segment electrodes so as to connect the third and fourth segment electrodes to each other, a fourth lead wire extending in a fourth direction on the second diagonal line opposite to the third direction is connected to the third and fourth segment electrodes so as to connect the third and fourth segment electrodes to each other, and first through fourth connection electrode sections to which the first through fourth lead wires are respectively connected are disposed at four corners of the rectangular substrate in the plan view.

According to this configuration, the first and second lead wires provided to the first substrate and the third and fourth lead wires provided to the second substrate do not overlap with each other in the plan view, and therefore, no parallel electrodes are constituted. Therefore, no wasteful electrostatic attractive force is generated between the first and second lead wires and the third and fourth lead wires, and further no wasteful capacitance is provided. Further, the wiring lengths of the first through fourth lead wires respectively to the first through fourth external connection electrode sections become the shortest. Therefore, the wiring resistances and the wiring capacitances of the first through fourth lead wires are reduced, and the charging/discharging rate of the first through fourth segment electrodes can be raised.

According to another aspect of the invention, in the optical filter according to the above aspect of the invention, it is possible that a ring width of the second segment electrode is made larger than a ring width of the first segment electrode.

Since the electrostatic attractive force is proportional to the area of the electrode, the electrostatic attractive force generated by the second segment electrode can be increased. This is because it is desired that the electrostatic attractive force generated by the second segment electrode located outside is greater than the electrostatic attractive force generated by the first segment electrode located inside.

According to another aspect of the invention, in the optical filter according to the above aspect of the invention, it is possible that the second surface of the first substrate includes a 2-1 surface, and a 2-2 surface disposed in a periphery of the 2-1 surface in the plan view, and having a step with the 2-1 surface, the first segment electrode is disposed on the 2-1 surface, the second segment electrode is disposed on the 2-2 surface, and an initial gap between the second segment electrode and the second electrode is made different from an initial gap between the first segment electrode and the second electrode.

Here, if it is assumed that the 2-1 surface and the 2-2 surface are coplanar with each other and the initial values of the respective gaps are the same, the inter-electrode gap of either one of the first and second segment electrodes, which is driven first, becomes larger than the inter-electrode gap of the segment electrode, which is driven later. This is because the inter-electrode gap of the segment electrode driven later is reduced in conjunction with the inter-electrode gap of the segment electrode driven first. Therefore, either one of the first and second segment electrodes driven first requires the initial electrostatic attractive force to be set excessively strong accordingly to the increment in the initial gap in comparison with the segment electrode driven later. By making the initial values of the respective inter-electrode gaps different from each other, such a harmful influence can be suppressed.

According to another aspect of the invention, in the optical filter according to the above aspect of the invention, it is possible that an initial gap between the second segment electrode and the second electrode is made smaller than an initial gap between the first segment electrode and the second electrode.

As described later, it is advantageous to first drive the second segment electrode located outside, and the initial gap between the second segment electrode and the second electrode can be reduced in accordance therewith.

According to another aspect of the invention, in the optical filter according to the above aspect of the invention, it is possible that an electrical potential difference control section adapted to control an electrical potential difference between each of the K segment electrodes and the second electrode is further provided, and the electrical potential difference control section applies a plurality of voltage values set for each of the K segment electrodes to each of the K segment electrodes to thereby switch each of the electrical potential differences from a first electrical potential difference to a second electrical potential difference larger than the first electrical potential difference, then to a third electrical potential difference larger than the second electrical potential difference, the first through third electrical potential differences being set for each of the K segment electrodes.

As described above, the electrical potential difference control section switches the electrical potential difference of each of the K segment electrodes and the second electrode in at least three levels of electrical potential difference so that the electrical potential difference increases monotonically. Thus, the gap between the first and second reflecting films is varied in at least 3×K levels to thereby vary the transmission peak wavelength. In other words, the first electrical potential difference, the second electrical potential difference, and the third electrical potential difference set to each of the K segment electrodes are determined so as to obtain the gaps between the first and second reflecting films with which the respective desired transmission peak wavelengths are realized.

Here, if the electrical potential difference is switched, for example, from the second electrical potential difference to the first electrical potential difference smaller than the second electrical potential difference, since the restoring force corresponding to the second electrical potential difference is stronger than the electrostatic attractive force corresponding to the first electrical potential difference, the time of the damped free vibration of the substrate due to occurrence of an overshoot and so on becomes longer, and therefore, a prompt wavelength variation operation is not achievable. In contrast thereto, since the electrical potential difference control section switches the electrical potential difference from the first electrical potential difference to the second electrical potential difference larger than the first electrical potential difference, and further to the third electrical potential difference larger than the second electrical potential difference, the damped free vibration of the substrate can be suppressed, and the prompt wavelength variation operation can be performed.

According to another aspect of the invention, in the optical filter according to the above aspect of the invention, it is possible that an electrical potential difference control section adapted to respectively control an inner electrical potential difference between the first segment electrode and the second electrode and an outer electrical potential difference between the second segment electrode and the second electrode is further provided, and the electrical potential difference control section applies a plurality of voltage values set for each of the first and second segment electrodes to each of the first and second segment electrodes to thereby switch each of the inside and outer electrical potential differences from a first electrical potential difference to a second electrical potential difference larger than the first electrical potential difference, then to a third electrical potential difference larger than the second electrical potential difference, the first through third electrical potential differences being set for each of the first and second segment electrodes.

By controlling the voltage values applied to the first and second segment electrodes adjacent to each other in a radial direction out of the K segment electrodes as described above, each of the inner electrical potential difference and the outer electrical potential difference is switched between at least three levels of electrical potential difference so that the electrical potential difference increases monotonically.

According to another aspect of the invention, in the optical filter according to the above aspect of the invention, it is possible that the electrical potential difference control section applies a first segment voltage to the first segment electrode in the case of setting the inner electrical potential difference to the first electrical potential difference, a second segment voltage to the first segment electrode in the case of setting the inner electrical potential difference to the second electrical potential difference, a third segment voltage to the first segment electrode in the case of setting the inner electrical potential difference to the third electrical potential difference, a fourth segment voltage to the second segment electrode in the case of setting the outer electrical potential difference to the first electrical potential difference, a fifth segment voltage to the second segment electrode in the case of setting the outer electrical potential difference to the second electrical potential difference, and a sixth segment voltage to the second segment electrode in the case of setting the outer electrical potential difference to the third electrical potential difference.

As described above, when setting each of the inner electrical potential difference and the outer electrical potential difference to the first through third electrical potential differences (i.e., the first through third electrical potential differences as the inner electrical potential difference and the first through third electrical potential differences as the outer electrical potential difference are not necessarily equal to each other) set to each of the first and second segment electrodes, the first through third segment voltages are applied to the first segment electrode, and the fourth through sixth segment voltages are applied to the second segment electrode. The applied voltages to be applied to the first and second segment electrodes are determined based on the inner and outer electrical potential differences for obtaining the gaps between the first and second reflecting films with which the desired transmission peak wavelengths are realized.

According to another aspect of the invention, in the optical filter according to the above aspect of the invention, it is possible that with respect to each of the inner electrical potential difference and the outer electrical potential difference, an absolute value of a difference between the second electrical potential difference and the third electrical potential difference is made smaller than an absolute value of a difference between the first electrical potential difference and the second electrical potential difference.

The electrostatic attractive force is proportional to the square of the electrical potential difference. Therefore, when switching the electrical potential difference in the ascending direction of the electrical potential difference, namely to the first electrical potential difference, the second electrical potential difference, and then the third electrical potential difference, if the absolute value of the difference between the first electrical potential difference and the second electrical potential difference and the absolute value of the difference between the second electrical potential difference and the third electrical potential difference are the same, it results that the electrostatic attractive force increases drastically, which causes the overshoot. Therefore, it is arranged that the absolute value of the difference between the second electrical potential difference and the third electrical potential difference is made smaller than the absolute value of the difference between the first electrical potential difference and the second electrical potential difference. Thus, it is possible to suppress the rapid increase in the electrostatic attractive force when the gap is narrowed to thereby further suppress the overshoot, and thus, the prompter wavelength variation operation can be realized. It should be noted that the amplitude of the absolute value of the difference between the electrical potential differences is determined depending on the dimension of the gap between the first and second reflecting films corresponding to the desired measurement wavelength, the rigidity of the movable substrate, the substrate area and the substrate thickness corresponding to each of the areas of the first and second reflecting films, and so on.

According to another aspect of the invention, in the optical filter according to the above aspect of the invention, it is possible that with respect to each of the inner electrical potential difference and the outer electrical potential difference, a period during which the electrical potential difference is set to the second electrical potential difference is made longer than a period during which the electrical potential difference is set to the first electrical potential difference, and a period during which the electrical potential difference is set to the third electrical potential difference is made longer than a period during which the electrical potential difference is set to the second electrical potential difference.

When the second electrical potential difference larger than the first electrical potential difference is set, or the third electrical potential difference larger than the second electrical potential difference is set, the restoring force of the substrate increases, and therefore, it might take a longer time until the substrate stops. In other words, the time period before the gap between the first and second reflecting films settles in place might be longer in some cases. In contrast, by setting the period set for the second electrical potential difference longer than the period set for the first electrical potential difference, and setting the period set for the third electrical potential difference longer than the period set for the second electrical potential difference, it is possible to settle the gap at a predetermined value. It should be noted that the length of the voltage application period is determined depending on the dimension of the gap between the first and second reflecting films corresponding to the desired measurement wavelength, the rigidity of the movable substrate, the substrate area and the substrate thickness corresponding to each of the areas of the first and second reflecting films, and so on.

According to another aspect of the invention, in the optical filter according to the above aspect of the invention, it is possible that the gap between the first reflecting film and the second reflecting film is set to a first distance in the case in which the electrical potential difference control section sets the outer electrical potential difference to the first electrical potential difference, the gap between the first reflecting film and the second reflecting film is set to a second distance smaller than the first distance in the case in which the electrical potential difference control section sets the outer electrical potential difference to the second electrical potential difference, the gap between the first reflecting film and the second reflecting film is set to a third distance smaller than the second distance in the case in which the electrical potential difference control section sets the outer electrical potential difference to the third electrical potential difference, and an absolute value of a difference between the first distance and the second distance is set substantially equal to an absolute value of a difference between the second distance and the third distance.

By varying the dimension of the gap between the first and second reflecting films to the first distance, the second distance, and then the third distance so as to monotonically decrease by a constant amount, the transmission peak wavelength is also shortened by a constant value.

According to another aspect of the invention, in the optical filter according to the above aspect of the invention, it is possible that the electrical potential difference control section changes the inner electrical potential difference while keeping the outer electrical potential difference at the third electrical potential difference, the gap between the first reflecting film and the second reflecting film is set to a fourth distance in the case in which the electrical potential difference control section sets the inner electrical potential difference to the first electrical potential difference, the gap between the first reflecting film and the second reflecting film is set to a fifth distance smaller than the fourth distance in the case in which the electrical potential difference control section sets the inner electrical potential difference to the second electrical potential difference, the gap between the first reflecting film and the second reflecting film is set to a sixth distance smaller than the fifth distance in the case in which the electrical potential difference control section sets the inner electrical potential difference to the third electrical potential difference, and an absolute value of a difference between the fourth distance and the fifth distance is set substantially equal to an absolute value of a difference between the fifth distance and the sixth distance.

By varying the inner electrical potential difference to the first through third electrical potential differences while keeping the outer electrical potential difference at the third electrical potential difference in such a manner as described above, the dimension of the gap between the first and second reflecting films can be varied to the fourth distance smaller than the third distance, the fifth distance, and then the sixth distance so as to be monotonically narrowed by a constant amount, and thus the transmission peak wavelength is also shortened by a constant value.

It should be noted that the dimension of the gap between the first and second reflecting films is more significantly affected by the electrostatic attractive force based on the inner electrical potential difference than the outer electrical potential difference. Therefore, if the inner electrical potential difference is firstly varied, and then the outer electrical potential difference is varied while keeping the inner electrical potential difference at a constant value, since the electrostatic attractive force by the inner electrical potential difference is dominant, the gap between the first and second reflecting films does not vary so largely as the outer electrical potential difference varies. Therefore, the outer electrical potential difference is varied first, and then the inner electrical potential difference is varied while keeping the outer electrical potential difference at a constant value.

According to another aspect of the invention, in the optical filter according to the above aspect of the invention, it is possible that the electrical potential difference control section changes the inner electrical potential difference after the third electrical potential difference as the outer electrical potential difference reaches a maximum outer electrical potential difference, while keeping the outer electrical potential difference at the maximum outer electrical potential difference.

According to this process, a further gap variation corresponding to one step from the gap between the first and second reflecting films set by the outer maximum electrical potential difference becomes possible due to the application of the inner electrical potential difference. Moreover, since the outer maximum electrical potential difference has already been reached, it is not required to further vary the outer electrical potential difference after the inner electrical potential difference is applied. Since it becomes unnecessary to vary the outer electrical potential difference after varying the inner electrical potential difference as described above, the harmful influence by the dominant electrostatic attractive force due to the inner electrical potential difference can be eliminated when varying the outer electrical potential difference.

According to another aspect of the invention, in the optical filter according to the above aspect of the invention, it is possible that the gap between the first reflecting film and the second reflecting film is set to a minimum distance when the electrical potential difference control section sets the third electrical potential difference as the inner electrical potential difference to a maximum inner electrical potential difference, and the maximum outer electrical potential difference and the maximum inner electrical potential difference are made substantially equal to each other within a range of a maximum supply voltage supplied to the electrical potential difference control section.

According to the configuration described above, since each the applied voltages to the respective first and second segment electrodes can be distributed taking the maximum supply voltage to be supplied to the electrical potential difference control section as the full-scale, the minimum voltage variation described above can be made larger than in the related art. Therefore, sensitivity to noise can be reduced.

According to another aspect of the invention, in the optical filter according to the above aspect of the invention, it is possible that the electrical potential difference control section applies voltages sequentially to the respective K segment electrodes to thereby vary the gap between the first reflecting film and the second reflecting film in N levels in total, and in comparison between a minimum value ΔVkmin of a voltage difference between applied voltages to be applied to the same segment electrode out of the K segment electrodes and a minimum voltage variation ΔV1min between N levels of applied voltages in the case of forming the first electrode as a single electrode, ΔV1min<ΔVkmin is true. Thus, the sensitivity to noise can be reduced as described above.

According to another aspect of the invention, there is defined an analytical instrument including any one of the optical filters described above. As an analytical instrument of this kind, the light beam reflected, absorbed, transmitted, or emitted by the analysis object is made to input a variable wavelength optical filter, the light beams with respective wavelengths transmitted through the optical filter are received by the light receiving element, and the signal from the light receiving element is operated by an arithmetic circuit, thereby measuring the intensity of the light beams with the respective wavelength, for example, thus the color, mixture component in the gas, and so on can be analyzed.

According to still another aspect of the invention, there is defined an optical apparatus including any one of the optical filters described above. As an optical apparatus of this kind, there can be cited a transmitter of an optical multiplexing communication system such as an optical code division multiplexing (OCDM) transmitter or a wavelength division multiplexing (WDM) transmitter. In the WDM, the channels are discriminated by the wavelength of the optical pulse constituting the optical pulse signals. Although in the OCDM the channels are discriminated by pattern matching of encoded optical pulse signals, the optical pulses constituting the optical pulse signals include light components with respective wavelengths different from each other. Therefore, in the transmitter of the optical multiplexing communication system, light beams with a plurality of wavelengths are used, and by using the optical filter according to any one of the above aspects of the invention, a plurality of light beams with respective wavelengths can be obtained from a light beam emitted from a single light source.

BRIEF DESCRIPTION OF THE DRAWINGS

The invention will be described with reference to the accompanying drawings, wherein like numbers reference like elements.

FIG. 8 is a characteristics table showing an example of voltage table data.

FIG. 12 is a characteristics table showing data of the embodiment regarding the electrical potential difference, the gap, and the variable wavelength shown in FIG. 8.

FIG. 16 is a characteristics table showing data of the comparative example related to the electrical potential difference, the gap, and the variable wavelength.

DESCRIPTION OF EXEMPLARY EMBODIMENTS

Hereinafter, some preferred embodiments of the invention will be described in detail. It should be noted that the embodiments explained below do not unreasonably limit the content of the invention as set forth in the appended claims, and all of the constituents set forth in the present embodiments are not necessarily essential to the invention.

Figure 1:
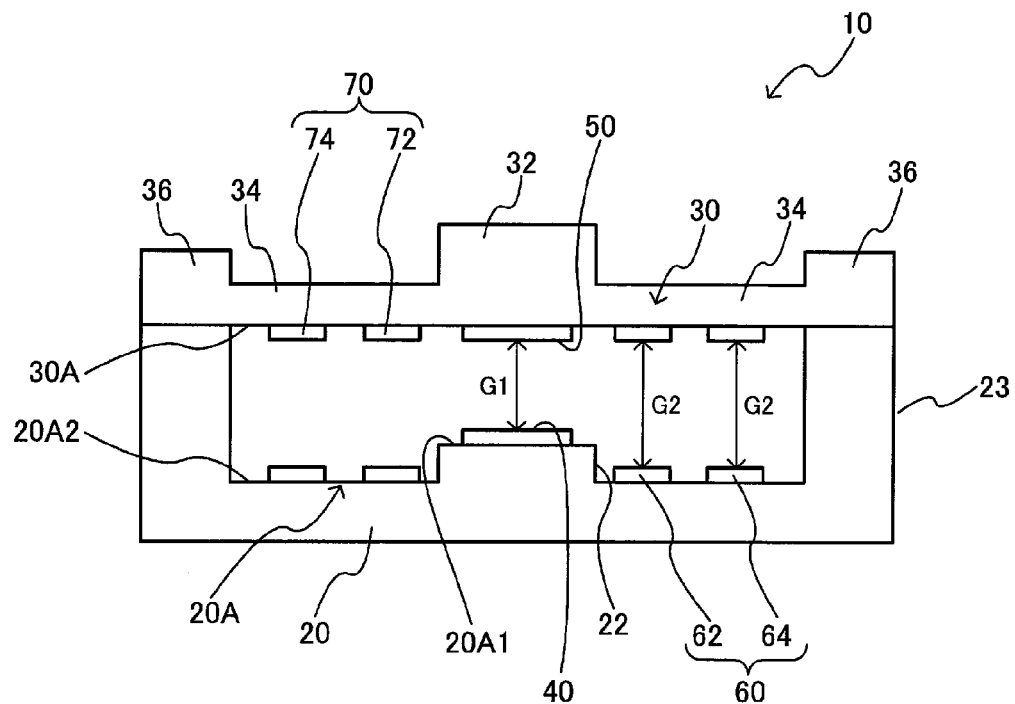
FIG. 1 is a cross-sectional view showing a non-voltage application state of an optical filter according to an embodiment of the invention.
Figure 2:
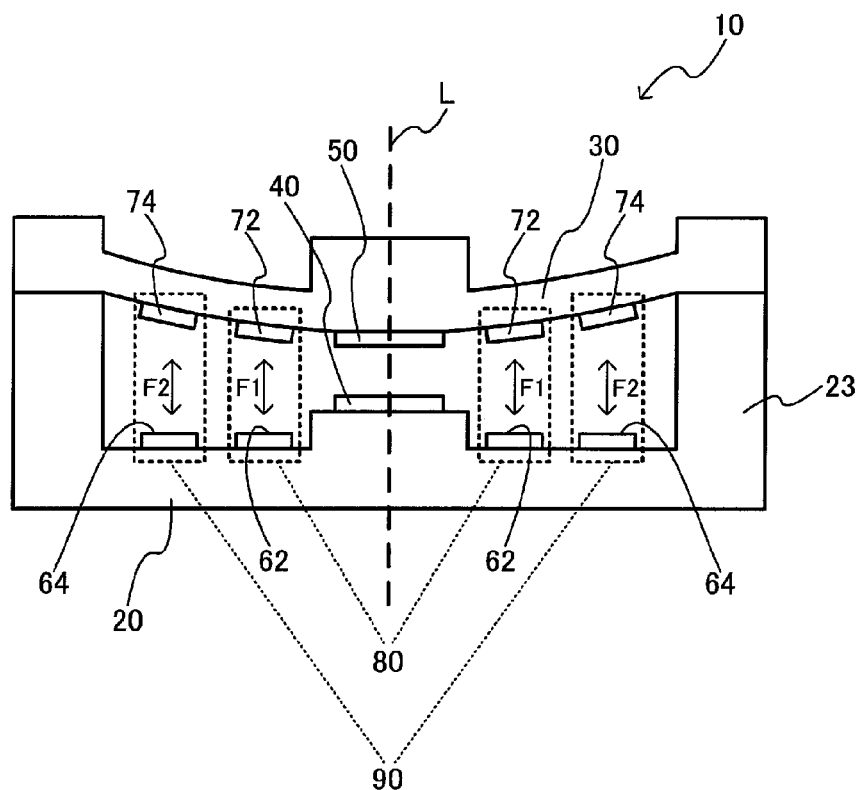
FIG. 2 is a cross-sectional view showing a voltage application state of the optical filter shown in FIG. 1.

1. OPTICAL FILTER 1.1. Filter Section of Optical Filter 1.1.1. General Description of Filter Section FIG. 1 is a cross-sectional view of an optical filter 10 according to the present embodiment in a non-voltage application state, and FIG. 2 is a cross-sectional view thereof in a voltage application state. The optical filter 10 shown in FIGS. 1 and 2 includes a first substrate 20 and a second substrate 30 opposed to the first substrate 20. Although in the present embodiment it is assumed that the first substrate 20 is a fixed substrate, and the second substrate 30 is a movable substrate or diaphragm, it is sufficient that either one or both of the substrates are movable.

In the present embodiment, there is provided a support section 23 formed, for example, integrally with the first substrate 20, and for movably supporting the second substrate 30. The support section 20 can also be provided to the second substrate 30, or can be formed separately from the first and second substrates 20, 30.

The first and second substrates 20, 30 can each be made of various types of glass such as soda glass, crystalline glass, quartz glass, lead glass, potassium glass, borosilicate glass, or alkali-free glass, a quartz crystal, or the like. Among these materials, as the constituent material of the substrates 20, 30 the glass containing alkali metal such as sodium (Na) or potassium (K) is preferable, and by forming the substrates 20, 30 using such glass materials, the adhesiveness with reflecting films 40, 50 and electrodes 60, 70 described later, and the bonding strength between the substrates can be improved. Further, these two substrates 20, 30 are bonded by, for example, surface activated bonding with a plasma-polymerized film to thereby be integrated with each other. Each of the first and second substrates 20, 30 has a square shape, for example 10 mm on a side, and the greatest diameter of the portion functioning as a diaphragm is, for example, 5 mm.

The first substrate 20 is formed by etching a glass substrate that has a thickness of, for example, 500 μm. The first substrate 20 is provided with a first reflecting film 40 having, for example, a circular shape formed on a first surface 20A1 located at a central portion of the first opposed surface 20A opposed to the second substrate 30. Similarly, the second substrate 30 is formed by etching a glass substrate that has a thickness of, for example, 200 μm. The second substrate 30 is provided with a second reflecting film 50, which has, for example, a circular shape and is opposed to the first reflecting film 40, formed at a central position of a second opposed surface 30A opposed to the first substrate 20.

It should be noted that the first and second reflecting films 40, 50 are each formed to have, for example, a circular shape with a diameter of about 3 mm. The first and second reflecting films 40, 50 are each a reflecting film formed of an AgC single layer, and can be provided respectively to the first and second substrates 20, 30 by a method such as sputtering. The AgC single layer reflecting film has a thickness dimension of, for example, 0.03 μm. Although in the present embodiment there is described an example of using the reflecting film of the AgC single layer capable of performing a dispersion operation in the entire visible light range as the first and second reflecting films 40, 50, the reflecting films are not limited thereto. It is also possible to use a dielectric multilayer film obtained by stacking laminated films of, for example, $TiO_2$ and $SiO_2$, which can perform the dispersion operation in a narrower wavelength band, but has a higher transmittance of the dispersed light beams, a narrower half-value width of the transmittance, and more preferable resolution compared to the AgC single layer reflecting film.

Further, it is possible to form antireflection films (AR) not shown on the respective surfaces of the first and second substrates 20, 30 on the opposite side to the first and second opposed surfaces 20A, 30A thereof at positions corresponding to the first and second reflecting films 40, 50. The antireflection films are each formed by alternately stacking low refractive index films and high refractive index films, and decrease the reflectance to the visible light on the interfaces of the first and second substrates 20, 30 while increasing the transmittance thereof.

The first and second reflecting films 40, 50 are disposed so as to be opposed to each other via a first gap G1 in the non-voltage application state shown in FIG. 1. It should be noted that although in the present embodiment a fixed mirror is used as the first reflecting film 40 and a movable mirror is used as the second reflecting film 50, it is possible to make either one or both of the first and second reflecting films movable in accordance with the configuration of the first and second substrates 20, 30 described above.

The second surface 20A2, which is located on the periphery of the first reflecting film 40 and on the periphery of the first surface 20A1 of the first substrate 20 in the plan view, is provided with the first electrode 60. Similarly, the second opposed surface 30A of the second substrate 30 is provided with the second electrode so as to be opposed to the first electrode 60. The first electrode 60 and the second electrode 70 are disposed so as to be opposed to each other via a second gap G2. It should be noted that the surfaces of the first and second electrodes 60, 70 can be covered by an insulating film.

In the present embodiment, the first opposed surface 20A of the first substrate 20 opposed to the second substrate 30 includes the first surface 20A1 provided with the first reflecting film 40 and the second surface 20A2 disposed in the periphery of the first surface 20A1 in the plan view, and provided with the first electrode 60. The first surface 20A1 and the second surface 20A2 are not coplanar with each other, there is a step 22 between the first surface 20A1 and the second surface 20A2, and the first surface 20A1 is placed nearer to the second substrate 30 than the second surface 20A2. Thus, the relationship of (first gap G1)<(second gap G2) becomes true with initial values in the non-voltage application state.

Figure 3:
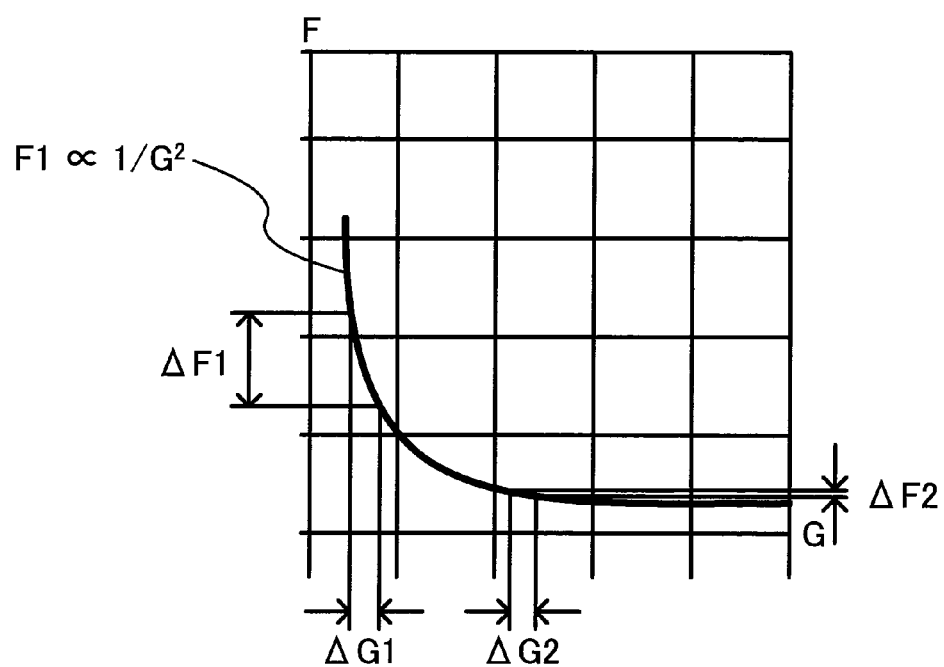
FIG. 3 is a characteristics diagram showing a relationship between electrostatic attractive force and an inter-electrode gap.

Here, according to Formula 1 described above, the electrostatic attractive force F is inversely proportional to the square of the gap G (the second gap G2) between the first and second electrodes 60, 70. FIG. 3 shows a relationship between the variation ΔF in the electrostatic attractive force F and the variation ΔG in the gap G between the first and second electrodes 60, 70. FIG. 3 shows a gap variation ΔG1 in an area where the inter-electrode gap G is small and a gap variation ΔG2 (=ΔG1) in an area where the inter-electrode gap G is large. In the area where the inter-electrode gap G is small, only by varying the gap as small as the gap variation ΔG1, the electrostatic attractive force F varies as large as ΔF1. In contrast thereto, in the area where the inter-electrode gap G is large, even in the case in which the gap varies as much as the gap variation ΔG2 equal to the gap variation ΔG1, the variation in the electrostatic attractive force F takes a relatively small value of ΔF2.

As described above, since in the area where the inter-electrode gap G is relatively narrow, the electrostatic attractive force F varies drastically in response to only minute variation in the gap G, and therefore, gap control for obtaining a predetermined electrostatic attractive force F is extremely difficult. In contrast thereto, in the area where the inter-electrode gap G is relatively large, the variation in the electrostatic attractive force F per unit gap variation is small. Therefore, it can be understood that it is easier to control the level of the electrostatic attractive force by the inter-electrode gap G in the case of using the flat area in the F-G characteristics curve shown in FIG. 3 where the variation in the electrostatic attractive force F is small.

Incidentally, the transmission wavelength band of the variable wavelength object is, for example, 380 through 700 nm, and the first gap G1 between the first and second reflecting films 40, 50 is as small as 140 through 300 nm. Therefore, as shown in FIG. 1, the configuration is set to satisfy (first gap G1)<(second gap G2), thereby making the control of the level of the electrostatic attractive force F easier.

The first electrode 60 is divided into at least K (K is an integer equal to or greater than 2) segment electrodes electrically isolated from each other, and in the present embodiment, the first electrode 60 can have first and second segment electrodes 62, 64 as an example with K=2. Specifically, the K segment electrodes 62, 64 can be set separately to voltages different from each other, while the second electrode 70 is a common electrode having the same electrical potential. It should be noted that if K≥3 is satisfied, the relationship between the first and second segment electrodes 62, 64 described below can be applied to any two segment electrodes adjacent to each other. It should be noted that the invention is not necessarily limited to those having the first electrode 60 divided into K segment electrodes. An embodiment in which the first electrode 60 is not divided will be described later with reference to FIGS. 15A through 18.

In the optical filter 10 having such a structure, the first and second substrates 20, 30 have respective areas where the reflecting films (the first and second reflecting films 40, 50) are respectively formed and respective areas where the electrodes (the first and second electrodes 60, 70) are respectively formed as areas different from each other in the plan view, and there is no chance of stacking the reflecting film and the electrode with each other as in the case of JP-A-11-142752. Therefore, even if one (the second substrate 30 in the present embodiment) of the first and second substrates 20, is formed as a movable substrate, the reflecting film and the electrode are not stacked with each other, and therefore, the movable substrate can be assured to be easy to deflect. Moreover, unlike JP-A-11-142752, since the reflecting films are not formed on the first and second electrodes 60, 70, the restriction of using light transmissive electrodes as the first and second electrodes 60, 70 does not arise. It should be noted that since even the light transmissive electrode affects the transmission characteristics, by eliminating the formation of the reflecting films on the first and second electrodes 60, 70, the optical filter 10 as a transmissive or reflective variable wavelength interference filter can be provided with desired transmission or reflection characteristics.

Further, in the optical filter 10 by applying the common voltage (e.g., the ground voltage) to the second electrode 70 disposed in the periphery of the second reflecting film 50 in the plan view, and applying voltages independent of each other to the respective K segment electrodes 62, 64 constituting the first electrode 60 disposed in the periphery of the first reflecting film 40 in the plan view to thereby make the electrostatic attractive forces F1, F2 indicated by the respective arrows act between the opposed electrodes as shown in FIG. 2, the first gap G1 between the first and second reflecting films 40, 50 can be varied so as to have a dimension smaller than the initial gap.

In other words, as shown in FIG. 2 showing the optical filter 10 in the voltage application state, a first gap variable drive section (an electrostatic actuator) 80 composed of the first segment electrode 62 and the second electrode 70 opposed thereto, and a second gap variable drive section (an electrostatic actuator) 90 composed of the second segment electrode 64 and the second electrode 70 opposed thereto are driven independently of each other.

As described above, by providing the plurality (K) of gap variable drive sections 80, 90 independent of each other disposed only in the periphery of the first and second reflecting films 40, 50 in the plan view, and varying two parameters, namely the values of the voltages applied respectively to the K segment electrodes 62, 64 and the number of segment electrodes selected for applying the voltage among the K segment electrodes 62, 64, the dimension of the gap between the first and second reflecting films 40, 50 is controlled.

It is difficult to obtain both of the large gap variable range and the low sensitivity to the voltage variation due to noise or the like with the parameter of the type of voltage alone as in the case of JP-A-11-142752. By adding the parameter of the number of electrodes as in the present embodiment, it becomes possible to generate more fine-tuned electrostatic attractive force to thereby perform fine gap adjustment in a larger gap variable range by applying the applied voltage range the same as in the case of controlling it by voltage alone to the individual segment electrodes.

Here, it is assumed that the maximum value of the applied voltage is Vmax, and the gap can be varied in N levels. In the case in which the first electrode 60 is not divided into a plurality of segments, it is necessary to divide the maximum voltage Vmax into N to thereby assign the applied voltages. On this occasion, it is assumed that the minimum value of the voltage variation between the applied voltages different from each other is $\Delta V1min$. In contrast, in the present embodiment, the applied voltage to each of the K segment electrodes can be assigned by dividing the maximum voltage Vmax into averagely (N/K). On this occasion, it is assumed that the minimum value of the voltage variation between the applied voltages different from each other applied to the same segment with respect to each of the K segment electrodes is $\Delta Vkmin$. In this case, it is obvious that $\Delta V1min < \Delta Vkmin$ becomes true.

As described above, if the minimum voltage variation $\Delta Vkmin$ can be assured to be large, the gap variation can be reduced even when the applied voltages to the K segment electrodes 62, 64 vary in a certain extent due to noise depending on the power supply variation, the environment, and so on. In other words, the sensitivity to noise becomes low, or the voltage sensitivity becomes lower. Thus, gap control with high accuracy becomes possible, and feedback control on the gap is not necessarily required as in JP-A-11-142752. Further, even if the feedback control is performed on the gap, since the sensitivity to noise is low, early settling can be achieved. In the present embodiment, by setting the areas of the first and second reflecting films 40, 50 on the center side to undriven areas, and the peripheries thereof to driven areas, the parallelism between the first and second reflecting films 40, 50 is maintained. The parallelism between the first and second reflecting films 40, 50 is an important technology component for a Fabry-Perot interferometer for attenuating the light beam with an unwanted wavelength using interference by multiply reflecting the light beam between the first and second reflecting films 40, 50.

In the present embodiment, in order for assuring bendability of the second substrate 30 as the movable substrate, an area where the second electrode 70 is formed is formed as a thin-wall section 34 with a thickness dimension of, for example, 50 µm as shown in FIG. 1. The thin-wall section 34 has a wall thickness smaller than that of a thick-wall section 32 of the area where the second reflecting film 50 is disposed and that of a thick-wall section 36 of the area having contact with the support section 23. In other words, in the second substrate 30 the second opposed surface 30A provided with the second reflecting film 50 and the second electrode 70 is a flat plane, the thick-wall section 32 is formed in a first area where the second reflecting film 50 is disposed, and the thin-wall section 34 is formed in a second area where the second electrode 70 is formed. As described above, by making the thick-wall section 32 difficult to bend while assuring the bendability with the thin-wall section 34, it becomes possible to vary the gap while keeping the flatness of the second reflecting film 50. An example of providing a step section or locally providing a thick-wall section to the second substrate 30 will be described later.

It should be noted that although in the present embodiment the (K) gap variable drive sections independent of each other are each constituted with an electrostatic actuator composed of a pair of electrodes, it is also possible to replace at least one of those electrostatic actuators with another actuator such as a piezoelectric element. It should be noted that the electrostatic actuator for providing attractive force in a non-contact manner causes little interference between gap variable drive sections, and is therefore suitable for controlling the gap with high accuracy. In contrast thereto, in the case, for example, in which two piezoelectric elements are disposed between the first and second substrates 20, 30, there is caused a phenomenon, for example, that the piezoelectric element, which is not driven, acts as what hinders the gap variation caused by the other piezoelectric element, which is driven, and a harmful effect is caused in the method of driving two or more gap variable drive sections independently of each other. From that point of view, the plurality of gap variable drive sections is preferably composed of the electrostatic actuators.

1.1.2. First Electrode

Figure 4A:
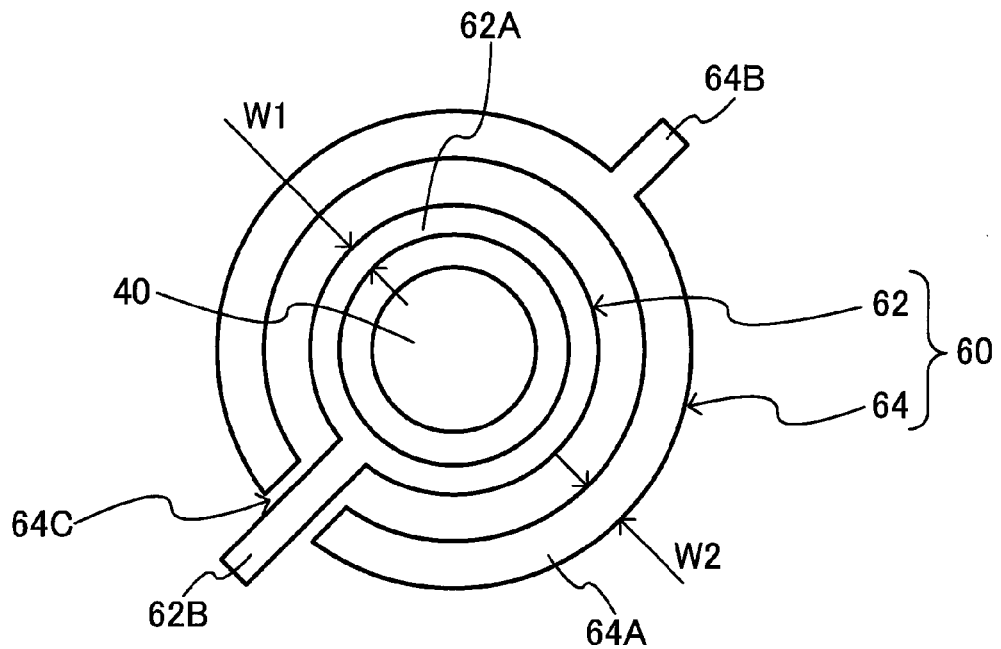
FIG. 4A is a plan view of a second electrode.

As shown in FIG. 4A, the K segment electrodes 62, 64 constituting the first electrode 60 can be arranged to have a concentric ring shape with respect to the center of the first reflecting film 40. Specifically, the first segment electrode 62 has a first ring-like electrode section 62A, the second segment electrode 64 has a second ring-like electrode section 64A outside the first ring-like electrode section 62A, and each of the ring-like electrode sections 62A, 64A has a concentric ring shape with respect to the first reflecting film 40. It should be noted that a "ring shape" is a term not limited to the shape of an endless ring, but includes a discontinuous ring shape, and is not limited to the shape of a circular ring, but includes the shapes of rectangular ring, polygonal ring, and so on.

According to this configuration, as shown in FIG. 2, the first and second segment electrodes 62, 64 become in an axisymmetric arrangement with respect to the center line L of the first reflecting film 40. According to this configuration, since the electrostatic attractive forces F1, F2 acting between the first and second electrodes 60, 70 in response to application of the voltages acts thereon axisymmetrically with respect to the center line L of the first reflecting film 40, parallelism between the first and second reflecting films 40, 50 is enhanced.

It should be noted that as shown in FIG. 4A, the ring width W2 of the second segment electrode 64 can be set larger than the ring width W1 of the first segment electrode 62 (W2>W1). This is because the electrostatic attractive force is proportional to the area of the electrode, and the electrostatic attractive force F2 generated by the second segment electrode 64 is stronger than the electrostatic attractive force F1 generated by the first segment electrode 62. In more detail, the second segment electrode 64 located outside is disposed nearer to the support section 23 of the substrates functions as a hinge section compared to the first segment electrode 62. Therefore, it is desired for the second segment electrode 64 to generate the electrostatic attractive force F2 strong enough to overcome the resistive force at the support section (the hinge section) 23. The second segment electrode 64 located outside has a larger diameter than that of the first segment electrode 62 located inside, and therefore, even if the widths are the same (W1=W2), the area of the second segment electrode 64 is larger. Therefore, although it is also possible to make the widths equal to each other (W1=W2), the ring width W2 is made larger to thereby make it possible to further increase the area to increase the electrostatic attractive force F2 generated by the second segment electrode 64. In particular, in the case in which the second segment electrode 64 located outside is driven prior to the first segment electrode 62 as described later, since the initial gap G2 between the second segment electrode 64 and the second electrode 70 is large, it is advantageous in view of the fact that it is possible to make the area of the second segment electrode 64 larger to thereby increase the electrostatic attractive force F2 generated there. On that occasion, since the gap is made smaller when starting to drive the first segment electrode 62 located inside as long as the drive state of the first segment electrode 64 is maintained, there is no harmful effect on driving if the ring width W1 of the first segment electrode 62 is small.

Here, a first lead wire 62B is connected to the first segment electrode 62, and a second lead wire 64B is connected to the second segment electrode 64. The first and second lead wires 62B, 64B are formed so as to extend in radial directions from the center of the first reflecting film 40, for example. There is provided a first slit 64C for making the second ring-like electrode section 64A of the second segment electrode 64 discontinuous. The first lead wire 62B extending from the first segment electrode 62 located inside is drawn to the outside of the second segment electrode 64 via the first slit 64C provided to the second segment electrode 64 located outside.

As described above, in the case of making the first and second segment electrodes 62, 64 respectively have the ring-like electrode sections 62A, 64A, a taking-out path for the first lead wire 62B of the first segment electrode 62 located inside can easily be assured by the first slit 64C provided to the second segment electrode 64 located outside.

1.1.3. Second Electrode

The second electrode 70 disposed on the second substrate 30 can be formed as a mat electrode in an area of the second substrate 30 including an area opposed to the first electrode 60 (the first and second segment electrodes 62, 64) provided to the first substrate 20. This is because the second electrode 70 is the common electrode set to the same voltage.

Alternatively, the second electrode 70 disposed on the second electrode 30 displaced with respect to the first substrate 20 as in the present embodiment can be divided into K segment electrodes similarly to the first electrode 60. The K segment electrodes can also be arranged to have a concentric ring shape with respect to the center of the second reflecting film 50. According to this configuration, since the area of the electrode provided to the second substrate 30, which is movable, is reduced to a minimum, the rigidity of the second substrate 30 is reduced, and the bendability can be assured.

Figure 4B:
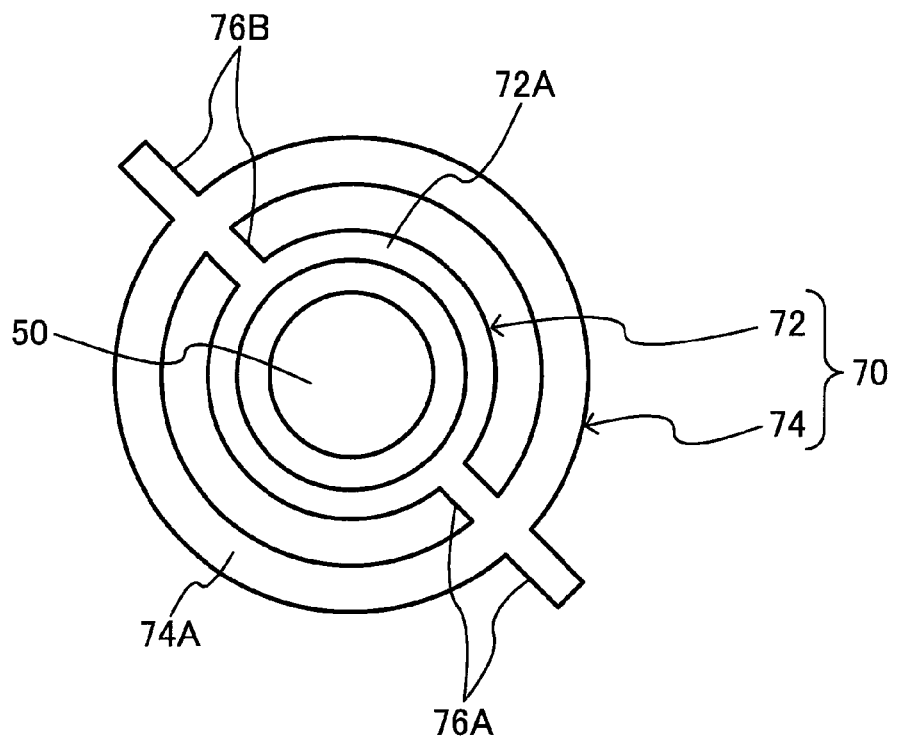
FIG. 4B is a plan view of a first electrode of the embodiment.

As shown in FIGS. 1, 2, and 4B, the K segment electrodes constituting the second electrode 70 can include the third segment electrode 72 and the fourth segment electrode 74. The third segment electrode 72 has a third ring-like electrode section 72A, the fourth segment electrode 74 has a fourth ring-like electrode section 74A outside the third ring-like electrode section 72A, and each of the ring-like electrode sections 72A, 74A has a concentric ring shape with respect to the second reflecting film. The meaning of the "concentric ring shape" is the same as used for the first electrode 60. The third segment electrode 72 corresponds to the first segment electrode 62, and the fourth segment electrode 74 corresponds to the second segment electrode 64. Therefore, in the present embodiment, the ring width (equal to the ring width W2 of the second segment electrode 64) of the fourth segment electrode 74 is larger than the ring width (equal to the ring width W1 of the first segment electrode 62) of the third segment electrode 72.

Further, the third and fourth segment electrodes 72, 74 are electrically connected to each other to be set to the same electrical potential. Therefore, third and fourth lead electrodes 76A, 76B are formed so as to extend from the center of the second reflecting film 50 in radial directions, for example. Each of the third and fourth lead electrodes 76A, 76B is electrically connected to both the third segment electrode 72 located inside and the fourth segment electrode 74 located outside. It should be noted that although the third and fourth segment electrodes 72, as a common electrode can be connected with a single lead electrode, by providing two or more lead electrodes, the wiring resistance can be reduced to thereby improve the charging/discharging rate of the common electrode.

1.1.4. Overlapping Area Between First and Second Electrodes

Figure 5A:
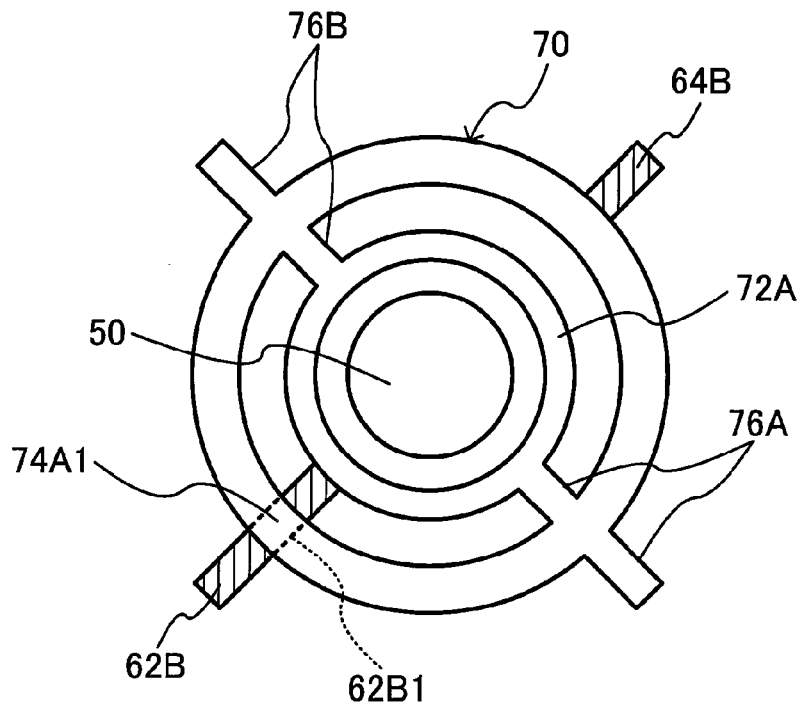
FIGS. 5A and 5B are plan views of the first and second electrodes in an overlapping state viewed from the side of a second substrate.

FIG. 5A shows an overlapping state in a plan view of the first and second electrodes 60, 70 of the present embodiment viewed from the side of the second substrate 30. In FIG. 5A, since the first electrode 60 located on the lower side has the first and second segment electrodes 62, 64 opposed to the third and fourth segment electrodes 72, 74 of the second electrode 70, the first electrode 60 does not appear in the plan view thereof viewed from the side of the second substrate 30. Only the first and second lead wires 62B, 64B of the first electrode located on the lower side appear in the plan view viewed from the side of the second substrate 30 as indicated by hatching. Since the third ring-like electrode section 74A of the second electrode 70 is continuous in the circumferential direction, the first lead wire 62B is opposed to the opposed area 74A1 of the third ring-like electrode section 74A in an intermediate area 62B1 thereof.

As shown in FIG. 4A, in the present embodiment since the second segment electrode 64 located outside out of the first electrode 20 has a first slit 64C, the electrostatic attractive force F2 (see FIG. 2) based on the voltage applied to the second segment electrode 64 does not act in the area of the slit 64C.

On the other hand, since the first lead wire 62B is disposed in the first slit 64C as shown in FIG. 4A, the electrostatic attractive force F1 (see FIG. 2) acting between the first lead wire 62B having the same electrical potential as the first segment electrode 62 located inside and the fourth segment electrode 74 located outside can be generated in the first slit 64C. As an advantage of this configuration, in the case of, for example, driving the first and second segment electrodes 62, 64 with substantially the same voltages, uniform electrostatic attractive force can be generated in substantially the entire circumference (including the opposed area 74A1 to the first slit 64C) of the fourth segment electrode 74 located outside.

Figure 5B:
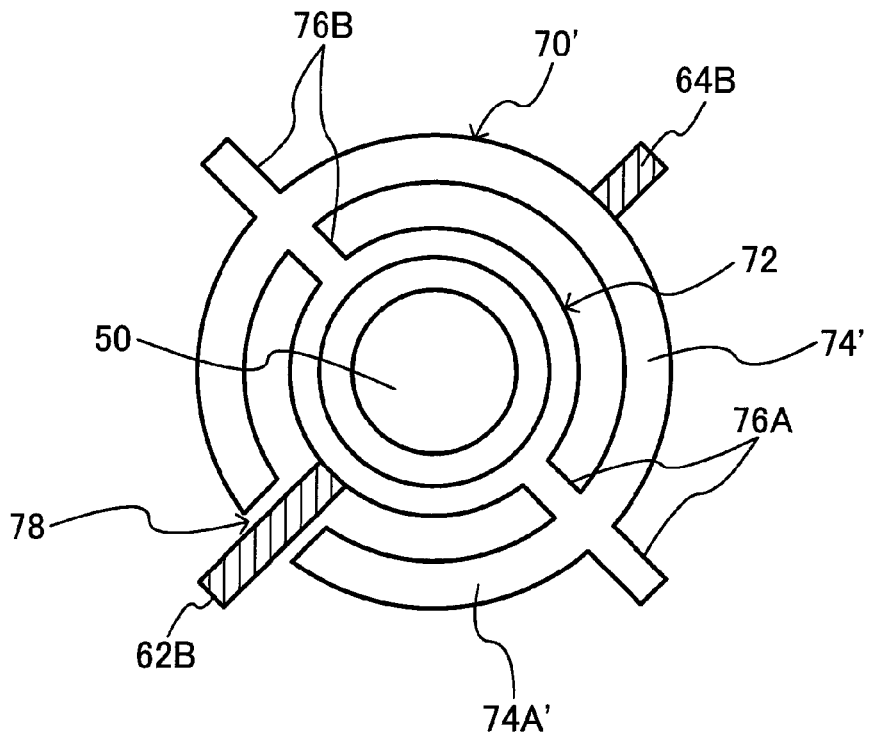

FIG. 5B shows an overlapping state in a plan view of the first and second electrodes 60, 70' as a modified example viewed from the side of the second substrate 30. The second electrode 70' shown in FIG. 5B is different from the second electrode 70 in the point that the fourth segment electrode 74 is further provided with a second slit for making the fourth ring-like electrode section 74' discontinuous at the position opposed to the first slit 64C of the first electrode 60. In other points, the second electrode 70' shown in FIG. 5B is the same as the second electrode 70 shown in FIG. 5A.

According to this configuration, the electrode opposed to the first lead wire 62B is eliminated. Therefore, it is possible to prevent unwanted electrostatic attractive force, which acts between the first lead wire 62B having the same electrical potential as the first segment electrode 62 located inside and the fourth segment electrode 74' located outside, from being generated in the first slit 64C when driving the first segment electrode 62 located inside, for example.

1.1.5. Lead Wires

Figure 6:
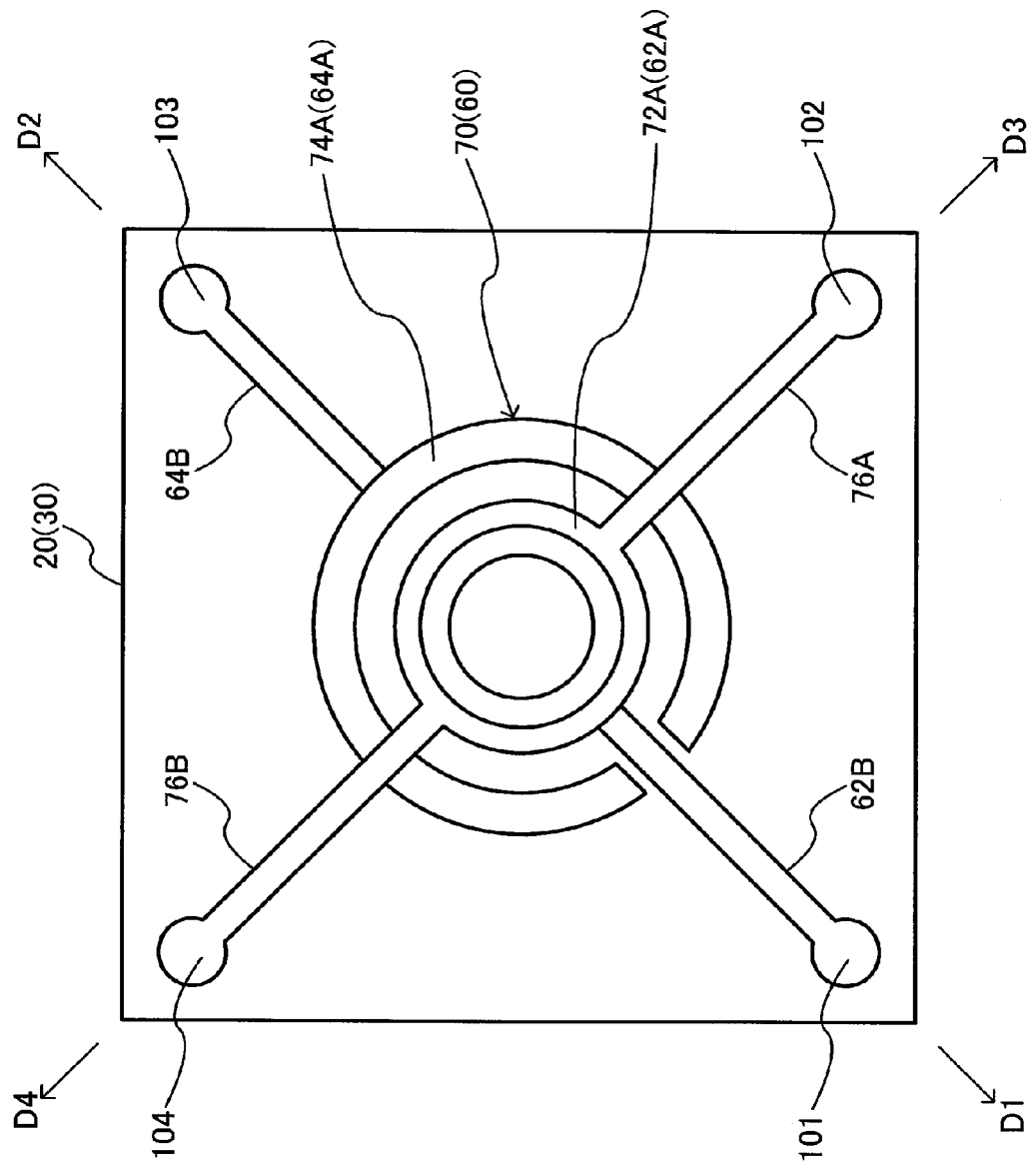
FIG. 6 is a plan view showing a wiring layout of first through fourth lead wires viewed from the side of the second substrate through the second substrate.

FIG. 6 is a plan view viewed from the side of the second substrate 30 through the second substrate 30, and shows a wiring layout of the first through fourth lead wires 62B, 64B, 76A, and 76B. In FIG. 6, at least one of the first and second substrates 20, 30 is formed as a rectangular substrate having first and second diagonal lines. In the present embodiment, each of the first and second substrates 20, 30 has a square shape, for example 10 mm on a side. Assuming that the direction in which the first lead wire 62B extends from the first ring-like electrode section 62A of the first segment electrode 62 along the first diagonal line is a first direction D1, the second lead wire 64B extends on the first diagonal line in a second direction D2 which is the reverse direction to the first direction D1. The third lead wire 76A extends in a third direction D3 along the second diagonal line. The fourth lead wire 76B extends on the second diagonal line in a fourth direction D4 which is the reverse direction to the third direction D3. Further, there are disposed first through fourth external connection electrode sections 101 through 104 located at four corners of the rectangular substrates 20, 30 in the plan view to which the first through fourth lead wires 62B, 64B, 76A, and 76B are connected respectively.

According to this configuration, firstly, the first and second lead wires 62B, 64B provided to the first substrate 20 and the third and fourth lead wires 76A, 76B provided to the second substrate 30 do not overlap with each other in the plan view, and therefore, no parallel electrodes are constituted. Therefore, no wasteful electrostatic attractive force is generated between the first and second lead wires 62B, 64B and the third and fourth lead wires 76A, 76B, and further no wasteful capacitance is provided. Further, the wiring lengths of the first through fourth lead wires 62B, 64B, 76A, and 76B respectively to the first through fourth external connection electrode sections 101 through 104 become the shortest. Therefore, the wiring resistances and the wiring capacitances of the first through fourth lead wires 62B, 64B, 76A, and 76B are reduced, and the charging/discharging rate of the first through fourth segment electrodes 62, 64, 72, and 74 can be raised.

It should be noted that it is also possible to provide the first through fourth external connection electrode sections 101 through 104 to either one of the first and second substrates 20, 30, or to provide some of the first through fourth external connection electrodes 101 through 104 and the rest thereof to the respective substrates 20, 30. In the case of disposing the first through fourth external connection electrodes 101 through 104 to either one of the first and second substrates 20, 30, the lead wire provided to the other of the first and second substrates 20, 30 can be connected to the external connection electrode section provided to the one of the substrates via a conductive paste or the like. It should be noted that the first through fourth external connection electrode sections 101 through 104 are connected to the outside via connection sections such as lead wires or wire bonding.

Further, the first through fourth lead wires 62B, 64B, 76A, and 76B can intersect, for example, a plasma polymeric film for bonding the first and second substrates 20, 30 to each other. Alternatively, it is also possible to draw the first through fourth lead wires 62B, 64B, 76A, and 76B to the outside beyond the bonding surface via groove sections provided to one of the bonding surfaces of the first and second substrates 20, 30.

1.2. Voltage Control System of Optical Filter

1.2.1. General Description of Applied Voltage Control System

Figure 7:
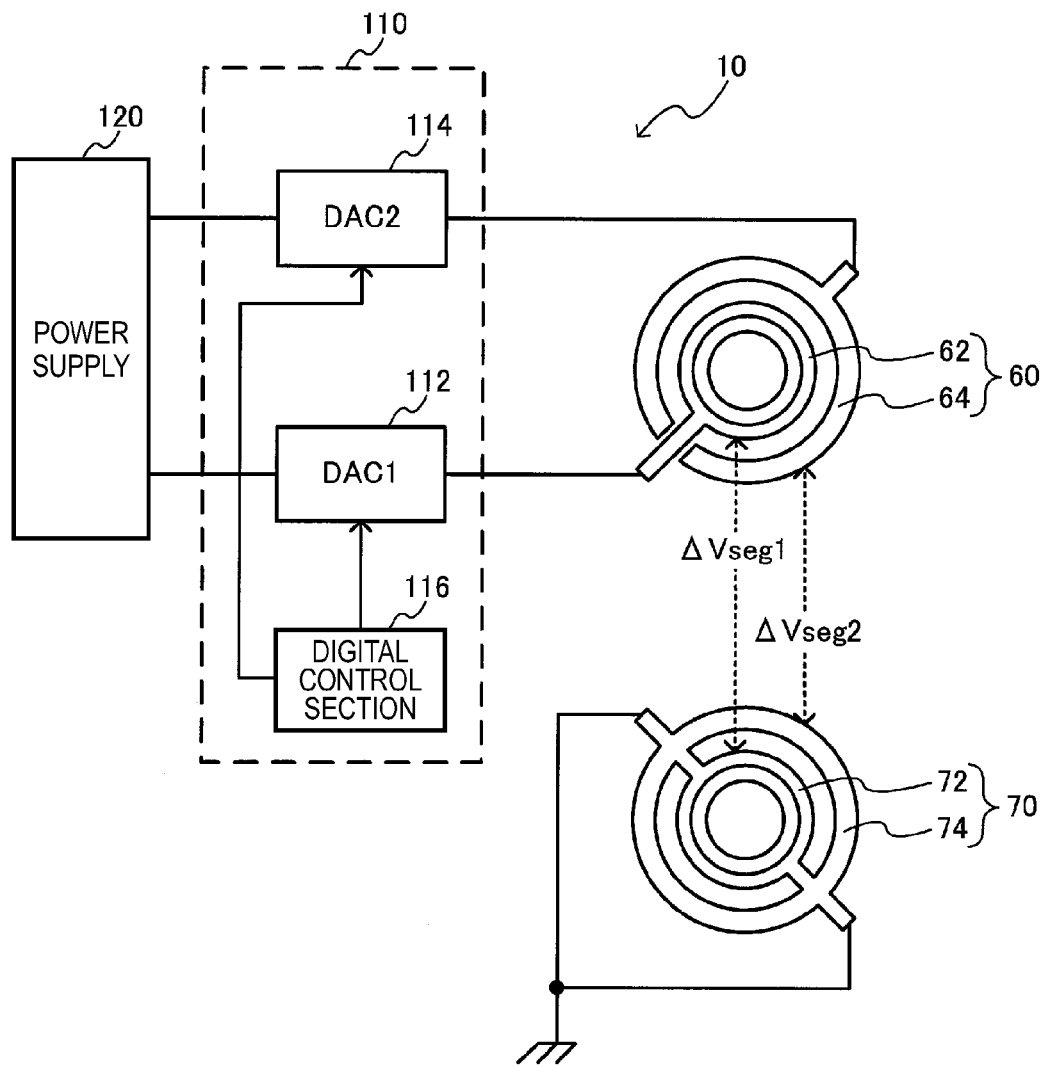
FIG. 7 is a block diagram of an applied voltage control system of the optical filter.

FIG. 7 is a block diagram of an applied voltage control system of the optical filter 10. As shown in FIG. 7, the optical filter 10 has an electrical potential difference control section 110 for controlling the electrical potential difference between the first electrode 60 and the second electrode 70. In the present embodiment, since the second electrode 70 (the third and fourth segment electrodes 72, 74) as the common electrode is fixed to a constant common voltage, for example, the ground voltage (0V), the electrical potential control section 110 varies the applied voltages to the first and second segment electrodes 62, 64 as the K segment electrodes constituting the first electrode 60 to thereby respectively control an inner electrical potential difference ΔVseg1 and an outer electrical potential difference ΔVseg2 between the respective first and second segment electrodes 62, 64 and the second electrode 70. It should be noted that the second electrode 70 can be provided with the common voltage other than the ground voltage, and on that occasion, it is possible for the electrical potential difference control section 110 to control application/non-application of the common voltage to the second electrode 70.

In FIG. 7 the electrical potential control section 110 includes a first segment electrode drive section connected to the first segment electrode 62 such as a first digital-analog converter (DAC1) 112, a second segment electrode drive section connected to the second segment electrode 64 such as a second digital-analog converter (DAC2) 114, and a digital control section 116 for performing control, such as digital control, on the digital-analog converters. The first and second digital-analog converters 112, 114 are supplied with voltages from a power supply 120. The first and second digital-analog converters 112, 114 are supplied with the voltages from the power supply 120, and at the same time output analog voltages corresponding to the digital values from the digital control section 116. As the power supply 120, what is implemented in an analytical instrument or an optical apparatus to which the optical filter 10 is mounted can be used, and further, a power supply dedicated to the optical filter 10 can also be used.

1.2.2. Method of Driving Optical Filter

FIG. 8 is a characteristics table showing an example of voltage table data, which is original data of the control in the digital control section 116 shown in FIG. 7. The voltage table data can be provided to the digital control section 116 itself, or implemented in the analytical instrument or the optical apparatus to which the optical filter 10 is mounted.

FIG. 8 shows an example with N=9 as the voltage table data for varying the gap between the first and second reflecting films 40, 50 in N levels in total by sequentially applying the voltages to each of the K segment electrodes 62, 64. It should be noted that in FIG. 8, the case in which the respective electrical potential differences between the first and second segment electrodes 62, 64 and the second electrode 70 are 0V is not included in the N levels of gap variable range. FIG. 8 shows only the case in which the voltage value other than the voltage value (0V) of the common voltage applied to the second electrode 70 is applied to at least one of the first and second segment electrodes 62, 64. It should be noted that it is also possible to define the case, in which both of the electrical potential difference between the first segment electrode 62 and the second electrode 70 and the electrical potential difference between the second segment electrode 64 and the second electrode 70 are 0V, as the maximum transmission peak wavelength.

Figure 9:
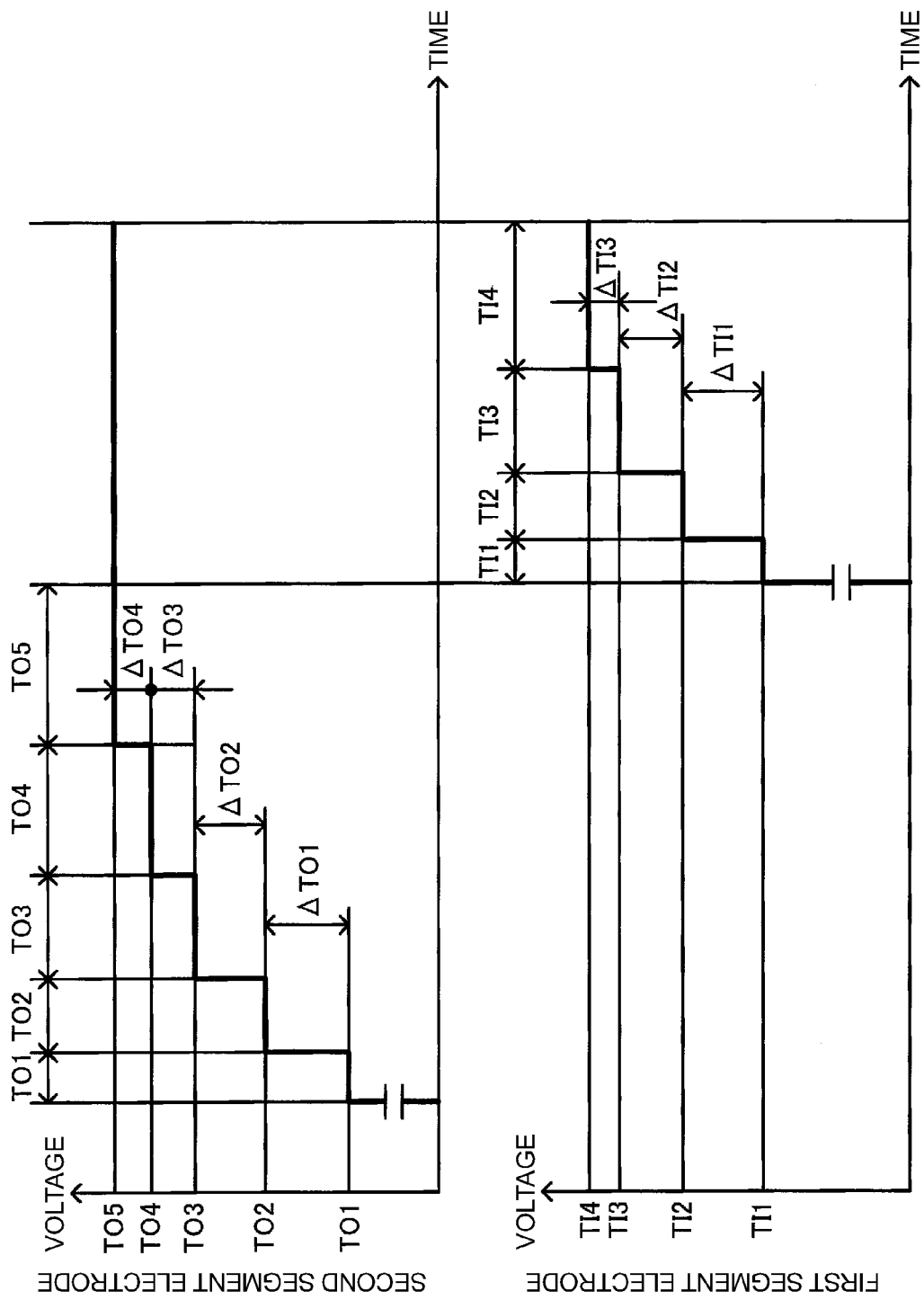
FIG. 9 is a timing chart of voltage application realized with the voltage table data.

The electrical potential difference control section 110 sets the voltage values to the respective K segment electrodes (the first and second segment electrodes 62, 64) in accordance with the voltage table data shown in FIG. 8, and then applies the voltage values to the respective K segment electrodes (the first and second segment electrodes 62, 64). FIG. 9 is a timing chart of the voltage application realized by performing the drive in the order of the data number of the voltage table data shown in FIG. 8.

As shown in FIGS. 8 and 9, L (=4) levels of voltages (VI1 through VI4; VI1<VI2<VI3<VI4) are applied to the first segment electrode 62, and M (=5) levels of voltages (VO1 through VO5; VO1<VO2<VO3<VO4<VO5) are applied to the second segment electrode 64, thereby varying the first gap G1 between the first and second reflecting films 40, 50 in N (N=L+M=9) levels from g0 to g8.

Figure 10:
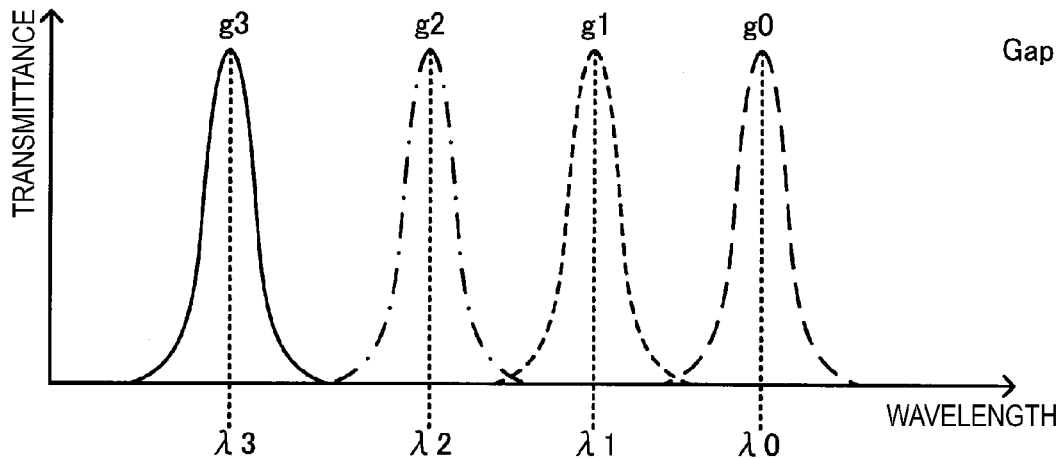
FIG. 10 is a graph showing a relationship between a gap between first and second reflecting films of the optical filter and a transmission peak wavelength.

According to the voltage control described above, the optical filter 10 can realize the wavelength transmission characteristics shown in FIG. 10. FIG. 10 shows the wavelength transmission characteristics in the case of varying the dimension of the first gap G1 between the first and second reflecting films 40, 50 in a range of, for example, g0 through g3. In the optical filter 10, when the dimension of the first gap G1 between the first and second reflecting films 40, 50 is varied in the range of, for example, g0 through g3 (g0>g1>g2>g3), the transmission peak wavelength is determined in accordance with the dimension of the first gap G1. Specifically, the wavelength λ of the light beam transmitted through the optical filter 10 satisfies the condition that the value obtained by multiplying the half wavelength (λ/2) by an integer (n) is equal to the dimension of the first gap G1 (n×λ=2G1). The light beam having the wavelength λ, which fails to satisfy the condition that the value obtained by multiplying the half wavelength (λ/2) by an integer (n) is equal to the dimension of the first gap G1, interferes itself to be attenuated in the process of being multiply-reflected by the first and second reflecting films 40, 50, and is never transmitted.

Therefore, as shown in FIG. 10, by varying the dimension of the first gap G1 between the first and second reflecting films 40, 50 sequentially to g0, g1, g2, and then g3 so as to be narrowed, the light beam transmitted through the optical filter 10 varies in the wavelength, namely the transmission peak wavelength, sequentially to λ0, λ1, λ2, and then λ3 (λ0>λ1>λ2>λ3) so as to be shortened.

Here, although the values of L, M, and N can arbitrarily be changed, the integers satisfying L≥3, M≥3, and N≥6 are preferable. If the integers satisfying L≥3, M≥3, and N≥6 are used, it is possible to switch the inner electrical potential difference ΔVseg1 and the outer electrical potential difference ΔVseg2 set respectively to the first and second segment electrodes 62, 64 from the first electrical potential difference ΔV1 to the second electrical potential difference ΔV2 larger than the first electrical potential difference ΔV1, and then the third electrical potential difference ΔV3 larger than the second electrical potential difference ΔV2.

As shown in FIG. 9, the electrical potential difference control section 110 firstly applies the voltages VO1 through VO5 sequentially to the second segment electrode 64 located outside. Since the second electrode is set to 0V, the electrical potential difference between the second electrode 70 and the second segment electrode 64, namely the outer electrical potential difference ΔVseg2, can sequentially be increased to the first electrical potential difference VO1, the second electrical potential difference VO2, the third electrical potential difference VO3, the fourth electrical potential difference VO4, and then the fifth electrical potential difference VO5. Thus, the dimension of the first gap G1 between the first and second reflecting films 40, 50 is sequentially reduced in such a manner as g0→g1→g2→g3→g4. As a result, the wavelength λ of the light beam transmitted through the optical filter 10, namely the transmission peak wavelength, sequentially varies so as to be shortened in such a manner as λ0→λ1→λ2→λ3→λ4.

Subsequently, as shown in FIG. 9, the electrical potential difference control section 110 sequentially applies the voltages VI1 through VI4 to the first segment electrode 62 located inside while keeping the application of the maximum applied voltage VO5 to the second segment electrode 64. Since the second electrode 70 is set to 0V, the electrical potential difference between the second electrode 70 and the first segment electrode 62, namely the inner electrical potential difference ΔVseg1, can sequentially be increased to the first electrical potential difference VI1, the second electrical potential difference VI2, the third electrical potential difference VI3, and then the fourth electrical potential difference VI4. Thus, the dimension of the first gap G1 between the first and second reflecting films 40, 50 is sequentially reduced in such a manner as g5→g6→g7→g8. As a result, the wavelength λ of the light beam transmitted through the optical filter 10, namely the transmission peak wavelength, sequentially varies so as to be shortened in such a manner as λ5→λ6→λ7→λ8.

Since the electrical potential difference control section 110 switches the outer electrical potential difference ΔVseg2 at least from the first electrical potential difference VO1 to the second electrical potential difference VO2 larger than the first electrical potential difference VO1, and further the third electrical potential difference VO3 larger than the second electrical potential difference VO2, and further switches the inner electrical potential difference ΔVseg1 at least from the first electrical potential difference VI1 to the second electrical potential difference VI2 larger than the first electrical potential difference VI1, and further the third electrical potential difference VI3 larger than the second electrical potential difference VI2, it is possible to suppress the damped free vibration of the second substrate 30, the movable substrate, and thus the prompt wavelength varying operation can be performed. Moreover, the electrical potential difference control section 110 applies three or more voltage values (voltage of 0 can be included) to each of the first and second segment electrodes 62, 64, namely applies at least the first segment voltage VI1, the second segment voltage VI2, and the third segment voltage VI3 to the first segment electrode 62, and applies at least the first segment voltage VO1, the second segment voltage VO2, and the third segment voltage VO3 to the second segment electrode 64. Therefore, it becomes possible to vary the gap in three or more levels only by driving either one of the first and second segment electrodes 62, 64, and therefore, it can be prevented to unnecessarily increase the number of segment electrodes of the first electrode 60.

1.2.3. Voltage Variation (Absolute Value of Difference Between First Electrical Potential Difference and Second Electrical Potential Difference, etc.)

The electrical potential difference control section 110 can make the absolute value of the difference between the second electrical potential difference and the third electrical potential difference smaller than the absolute value of the difference between the first electrical potential difference and the second electrical potential difference with respect to each of the inner electrical potential difference ΔVseg1 and the outer electrical potential difference ΔVseg2. Since in the present embodiment the second electrode 70 is fixed to the common voltage of 0V, the absolute value of the difference between the first electrical potential difference and the second electrical potential difference as the outer electrical potential difference ΔVseg2, for example, is equivalent to the voltage variation ΔVO1 between the first segment voltage VO1 and the second segment voltage VO2 applied to the second segment electrode 64 as shown in FIGS. 8 and 9. As shown in FIGS. 8 and 9, the voltage variations of the outer electrical potential difference ΔVseg2 are in a descending relationship of ΔVO1>ΔVO2>ΔVO3>ΔVO4, and the voltage variations of the inner electrical potential difference ΔVseg1 are also in a descending relationship of ΔVI1>ΔVI2>ΔVI3.

Figure 11:
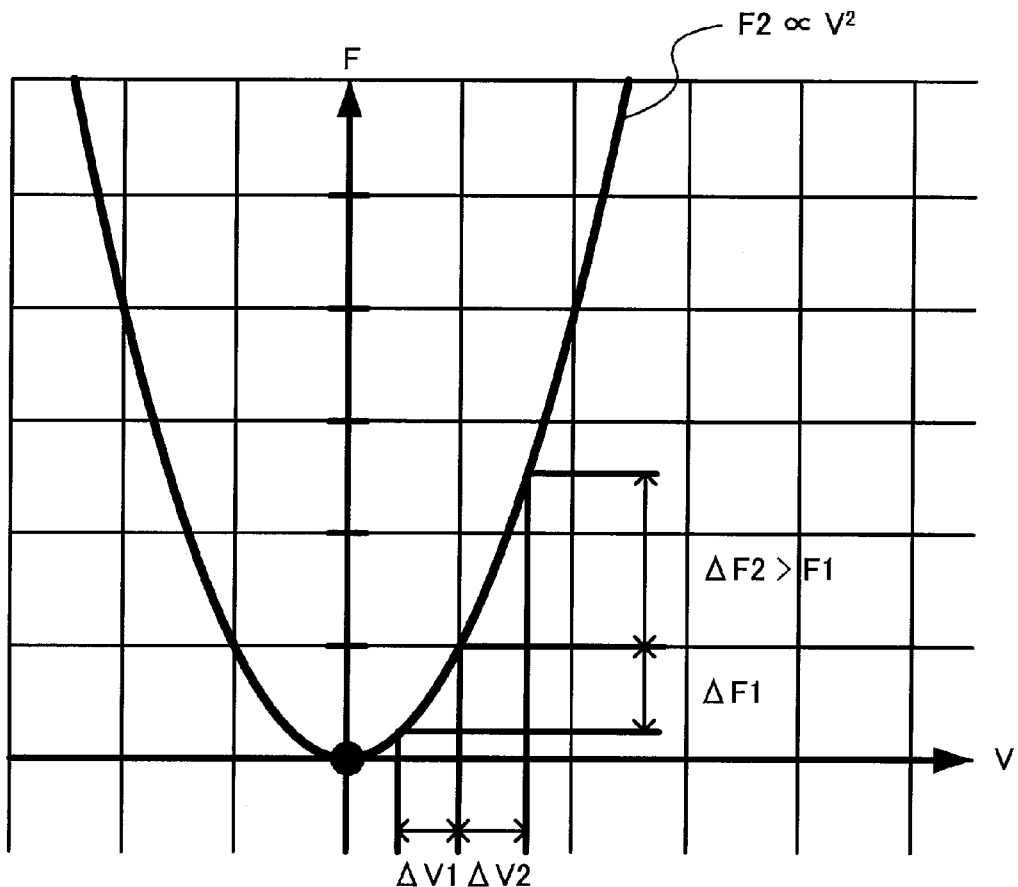
FIG. 11 is a graph showing a relationship between an electrical potential difference between the first and second electrodes and the electrostatic attractive force.

The reason of setting such a relationship as described above is as follows. According to Formula 1 described above, the electrostatic attractive force F is proportional to the square of the electrical potential difference (the applied voltage V to the first electrode 60 in the present embodiment) between the first and second electrodes 60, 70. FIG. 11 is a graph (showing F=V²) of the electrostatic attractive force F proportional to the square of the electrical potential difference V. As shown in FIG. 11, when switching the electrical potential difference V in the ascending direction to the first electrical potential difference, the second electrical potential difference, and then the third electrical potential difference, if the absolute value ΔV1 of the difference between the first electrical potential difference and the second electrical potential difference and the absolute value ΔV2 of the difference between the second electrical potential difference and the third electrical potential difference are the same (ΔV1=ΔV2 in FIG. 11), it results that the increment ΔF of the electrostatic attractive force rapidly increases from ΔF1 to ΔF2, which causes an overshoot.

Therefore, it is arranged that the absolute value ΔV2 of the difference between the second electrical potential difference and the third electrical potential difference is smaller than the absolute value ΔV1 of the difference between the first electrical potential difference and the second electrical potential difference. Thus, it is possible to suppress the rapid increase in the electrostatic attractive force when the gap is narrowed to thereby further suppress the overshoot, and thus, the prompter wavelength variation operation can be realized.

1.2.4. Voltage Application Period

The electrical potential difference control section 110 can set the period during which the electrical potential difference is set to the second electrical potential difference longer than the period during which the electrical potential difference is set to the first electrical potential difference, and the period during which the electrical potential difference is set to the third electrical potential difference longer than the period during which the electrical potential difference is set to the second electrical potential difference with respect to each of the inner electrical potential difference ΔVseg1 and the outer electrical potential difference ΔVseg2. In the present embodiment, as shown in FIG. 9, regarding the outer electrical potential difference ΔVseg2, the period TO2 of the second electrical potential difference VO2 is longer than the period TO1 of the first electrical potential difference VO1, the period TO3 of the third electrical potential difference VO3 is longer than the period TO2 of the second electrical potential difference VO2, and the periods are in an ascending relationship of T01<T02<T03<T04<T05. Similarly, as shown in FIG. 9, regarding the inner electrical potential difference ΔVseg1, the period TI2 of the second electrical potential difference VI2 is longer than the period TI1 of the first electrical potential difference VI1, the period TI3 of the third electrical potential difference VI3 is longer than the period TI2 of the second electrical potential difference VI2, and the periods are in an ascending relationship of TI1<TI2<TI3<TI4.

When the second electrical potential difference larger than the first electrical potential difference is set, or the third electrical potential difference larger than the second electrical potential difference is set, the restoring force of the second substrate 30 also increases. Therefore, the time until the second substrate 30 stops becomes longer. In other words, the time until the first gap G1 between the first and second reflecting films 40, 50 settles in place becomes longer. In contrast, by setting the period set for the second electrical potential difference longer than the period set for the first electrical potential difference, and setting the period set for the third electrical potential difference longer than the period set for the second electrical potential difference as in the present embodiment, it is possible to settle the first gap G1 at a predetermined value.

Figure 13:
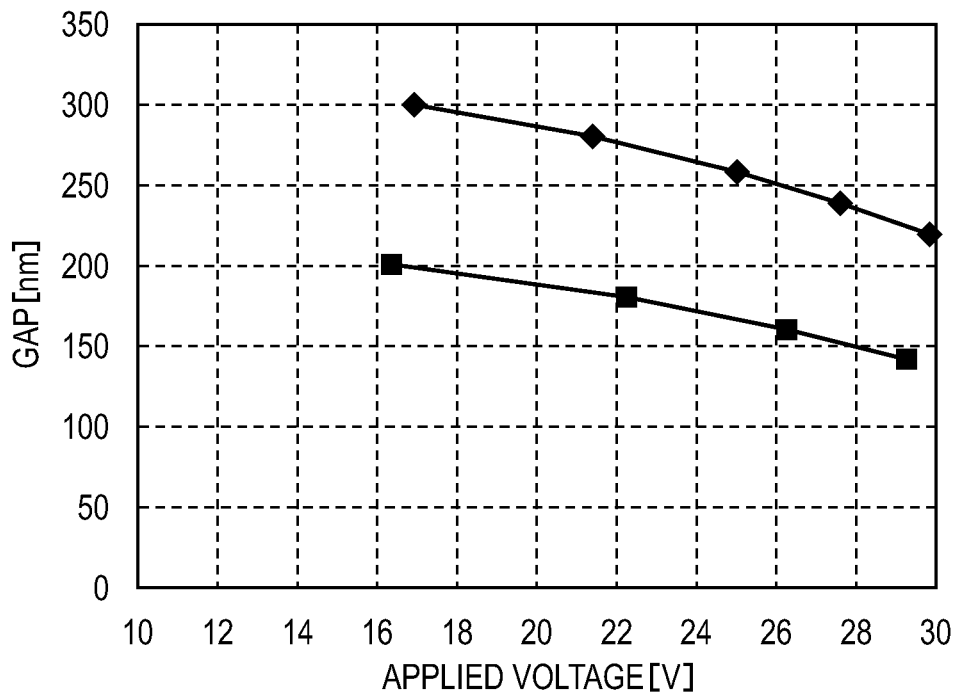
FIG. 13 is a graph showing a relationship between the applied voltage and the gap shown in FIG. 12.
Figure 14:
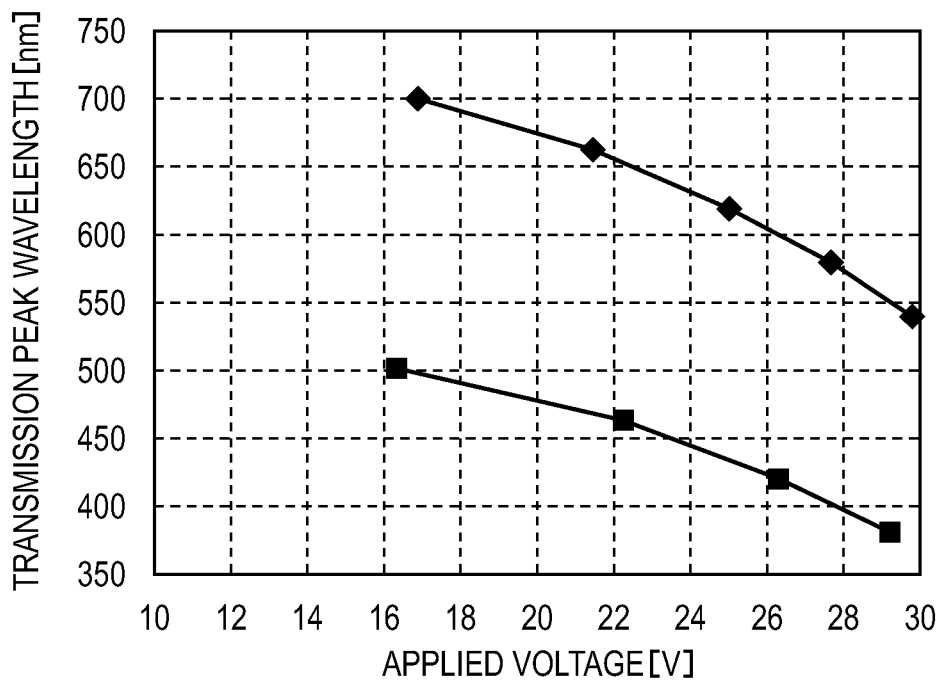
FIG. 14 is a graph showing a relationship between the applied voltage and the transmission peak wavelength shown in FIG. 12.

1.2.5. First Specific Example of Electrical Potential Difference, Gap, and Variable Wavelength FIG. 12 is a characteristics table showing data of a first specific example regarding the electrical potential difference, the gap, and the variable wavelength shown in FIG. 8. The data numbers 1 through 9 in FIG. 12 correspond to the data numbers 1 through 9 in FIG. 8. FIG. 13 is a graph showing a relationship between the applied voltage and the gap shown in FIG. 12. FIG. 14 is a graph showing a relationship between the applied voltage and the transmission peak wavelength shown in FIG. 12.

In FIG. 12, in order for making the transmission peak wavelength variable in 9 levels from the maximum wavelength λ0 (=700 nm) to the minimum wavelength λ8 (=380 nm) of the transmission peak wavelength, the first gap G1 between the first and second reflecting films 40, 50 is made variable in 9 levels from the maximum gap g0 (=300 nm) to the minimum gap g8 (=140 nm) (see also FIG. 13). In accordance therewith, the transmission peak wavelength is made variable in 9 levels from the maximum wavelength λ0 to the minimum wavelength λ8 (see also FIG. 14). Moreover, in FIG. 12, by setting the 9 levels of gaps g0 through g8 from the maximum gap g0 to the minimum gap g8 at regular intervals (=20 nm), the 9 levels of the wavelength λ0 through λ8 from the maximum wavelength λ0 to the minimum wavelength λ8 are also set to have regular intervals (=40 nm). By varying the dimension of the first gap G1 between the first and second reflecting films so as to sequentially decrease by a constant amount, the transmission peak wavelength is also shortened by a constant value.

The electrical potential difference control section 110 sets the outer electrical potential difference ΔVseg2 sequentially to VO1 (=16.9V), VO2 (=21.4V), VO3 (=25V), VO4 (=27.6V), and then VO5 (=29.8V), and then sets the inner electrical potential difference ΔVseg1 sequentially to VI1 (=16.4V), VI2 (=22.2V), VI3 (=26.3V), and then VI4 (=29.3V) while keeping the outer electrical potential difference ΔVseg2 at VO5 (=29.8V).

It should be noted that the dimension of the first gap G1 between the first and second reflecting films 40, 50 is more significantly affected by the electrostatic attractive force F1 based on the inner electrical potential difference ΔVseg1 than the electrostatic attractive force F2 based on the outer electrical potential difference ΔVseg2. Therefore, if the inner electrical potential difference ΔVseg1 is firstly varied, and then the outer electrical potential difference ΔVseg2 is varied while keeping the inner electrical potential difference ΔVseg1 at a constant value, since the electrostatic attractive force F1 by the inner electrical potential difference ΔVseg1 is dominant, the gap between the first and second reflecting films 40, 50 does not vary so largely as the outer electrical potential difference ΔVseg2 varies. Therefore, in the present embodiment, the outer electrical potential difference ΔVseg2 is varied first, and then the inner electrical potential difference ΔVseg1 is varied while keeping the outer electrical potential difference ΔVseg2 at a constant value.

After the outer electrical potential difference ΔVseg2 reaches the outer maximum electrical potential difference VO5, the electrical potential difference control section 110 varies the inner electrical potential difference ΔVseg1 while keeping the outer electrical potential difference ΔVseg2 at the outer maximum electrical potential difference VO5. According to this process, a further gap variation corresponding to one step from the first gap G1 set by the outer maximum electrical potential difference VO5 becomes possible due to the application of the inner electrical potential difference ΔVseg1. Moreover, since the outer maximum electrical potential difference VO5 has already been reached, it is not required to further vary the outer electrical potential difference ΔVseg2 after the inner electrical potential difference ΔVseg1 is applied. Therefore, when varying the outer electrical potential difference ΔVseg2, no harmful influence is caused by the dominant electrostatic attractive force F1 based on the inner electrical potential difference ΔVseg1.

When the electrical potential difference control section 110 set the inner electrical potential difference ΔVseg1 to the inner maximum electrical potential difference VI4, the first gap G1 between the first and second reflecting films 40, 50 is set to the minimum distance g8. The outer maximum electrical potential difference VO5 and the inner maximum electrical potential difference VI4 can be set substantially equal to each other within a range not exceeding the maximum supply voltage Vmax supplied to the electrical potential difference control section 110. In the present embodiment the maximum supply voltage Vmax (=30V), for example, is supplied to the electrical potential difference control section 110 from the power supply 120 shown in FIG. 7. On this occasion, the outer maximum electrical potential difference VO5 is set to 29.8V not exceeding the maximum supply voltage Vmax (30V), and further the inner maximum electrical potential difference VI4 is also set to 29.3V not exceeding the maximum supply voltage Vmax (30V).

In FIG. 12, although a minute difference of 0.5V exists between the outer maximum electrical potential difference VO5 and the inner maximum electrical potential difference VI4, it can be said that they are substantially the same. The minute difference occurs as a result of the design made under the intention that the transmission peak wavelength is obtained using the full scale (see FIGS. 13 and 14) of the range not exceeding the maximum supply voltage Vmax (30V) with respect to each of the inner electrical potential difference ΔVseg1 and the outer electrical potential difference ΔVseg2. It is possible to strictly conform the outer maximum electrical potential difference VO5 and the inner maximum electrical potential difference VI4 to each other by adjusting the area ratio between the first and second segment electrodes 62, 64 and so on. However, there is little necessity for strictly conforming them. It should be noted that according to the drive method of the present embodiment as explained with reference to FIG. 5A, by making the outer maximum electrical potential difference VO5 and the inner maximum electrical potential difference VI4 substantially equal to each other, there is obtained an advantage that even electrostatic attractive force can be generated in almost entire circumference (including the opposed area 74A1 to the first slit 64C) of the fourth segment electrode 74 located outside.

In the present embodiment the electrical potential difference control section 110 sequentially applies the voltages to K (=2) electrodes, namely the first and second segment electrodes 62, 64 to thereby make the first gap G1 between the first and second reflecting films 40, 50 variable in N (=9) levels in total. On this occasion, the minimum value of the voltage variation between the applied voltages to be applied to the same segment electrode 62 (or 64) out of the K (=2) electrodes, namely the first and second segment electrodes 62, 64 is defined as ΔVkmin. In the example shown in FIGS. 8 and 12, regarding the first segment electrode 62, ΔVkmin=ΔVI3=3.0V is obtained, and regarding the second segment electrode 64, ΔVkmin=ΔVO4=2.2V is obtained. Considering the fact that the power supply noise is about 0.1V, it is obvious from the comparison with the comparative example described below that the minimum voltage value ΔVkmin has low sensitivity to noise.

Figure 15A:
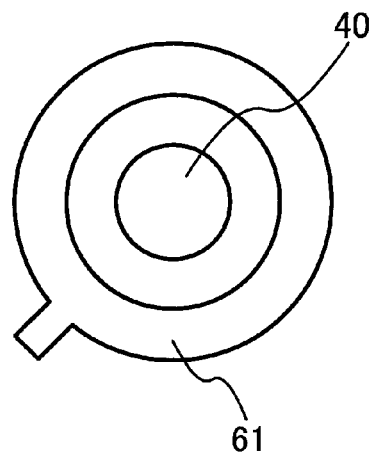
FIGS. 15A and 15B are plan views showing first and second electrodes of a comparative example.
Figure 15B:
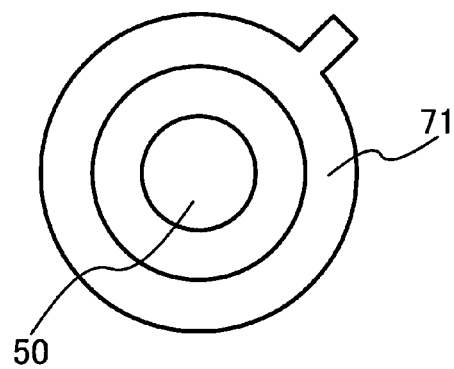

1.2.6. Second Specific Example of Electrical Potential Difference, Gap, and Variable Wavelength In the second specific example, as shown in FIGS. 15A and 15B, the first electrode 61 shown in FIG. 15A is used instead of the first electrode 60 of the first specific example, and the second electrode 71 shown in FIG. 15B is used instead of the second electrode 70 of the first specific example. Specifically, the first and second electrodes 61, 71 of the second specific example are not divided into segments.

Figure 17:
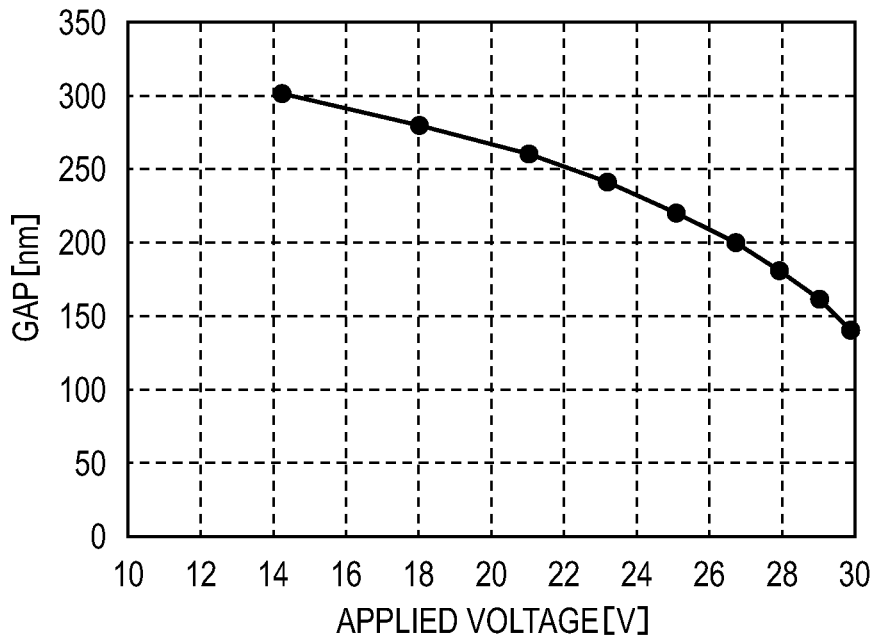
FIG. 17 is a graph showing a relationship between the applied voltage and the gap shown in FIG. 16.
Figure 18:
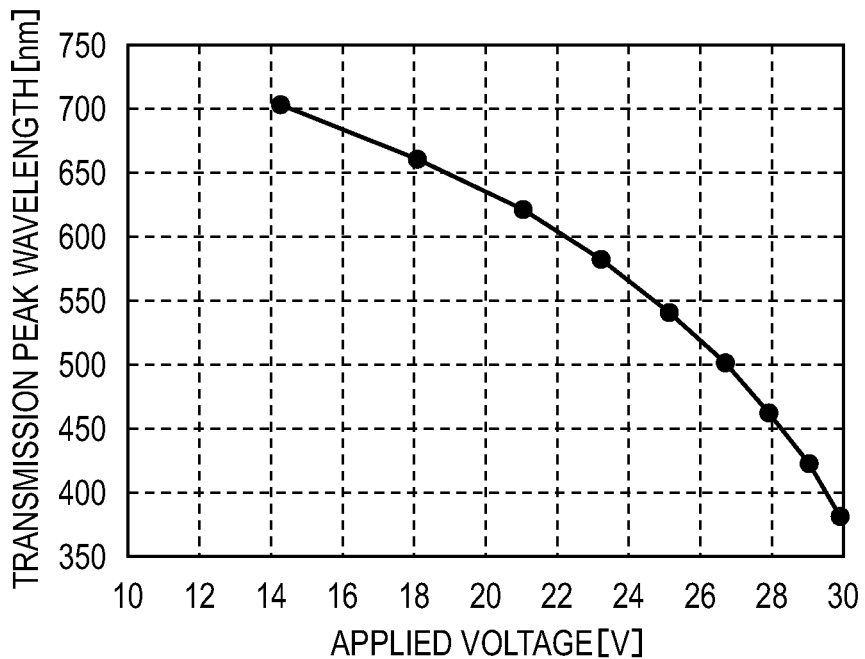
FIG. 18 is a graph showing a relationship between the applied voltage and the transmission peak wavelength shown in FIG. 16.

FIG. 16 is a characteristics table showing the data of the electrical potential difference between the first and second electrodes 61, 71 shown in FIGS. 15A and 15B, and the gap and the variable wavelength obtained therefrom. The data numbers 1 through 9 in FIG. 16 correspond to the data numbers 1 through 9 in FIGS. 8 and 12. FIG. 17 is a graph showing a relationship between the applied voltage and the gap shown in FIG. 16. FIG. 18 is a graph showing a relationship between the applied voltage and the transmission peak wavelength shown in FIG. 16.

Also in FIG. 16, in order for making the transmission peak wavelength variable in 9 levels from the maximum wavelength λ0 (=700 nm) to the minimum wavelength λ8 (=380 nm) of the transmission peak wavelength, the first gap G1 between the first and second reflecting films 40, 50 is made variable in 9 levels from the maximum gap g0 (=300 nm) to the minimum gap g8 (=140 nm) (see also FIG. 16). In accordance therewith, the transmission peak wavelength is made variable in 9 levels from the maximum wavelength λ0 to the minimum wavelength λ8 (see also FIG. 17).

It should be noted that in the second specific example the 9 levels of voltage applied to the first electrode 61 as a unique electrode are set within the full scale with the maximum supply voltage Vmax (30V).

The minimum voltage variation between the 9 levels of applied voltage in the case of forming the first electrode 61 of a unique electrode as in the second specific example is defined as ΔV1min. In the example shown in FIG. 16, ΔV1min=0.9V is provided. Considering the fact that the power supply noise is about 0.1V, the minimum voltage variation ΔV1min of the second specific example has high sensitivity to noise.

In comparison between the minimum voltage variation ΔVkmin of the first specific example and the minimum voltage variation ΔV1min of the second specific example, ΔV1min<ΔVkmin becomes true, and therefore, according to the first specific example, the sensitivity to noise can be reduced.

2. MODIFIED EXAMPLE OF OPTICAL FILTER

Figure 19:
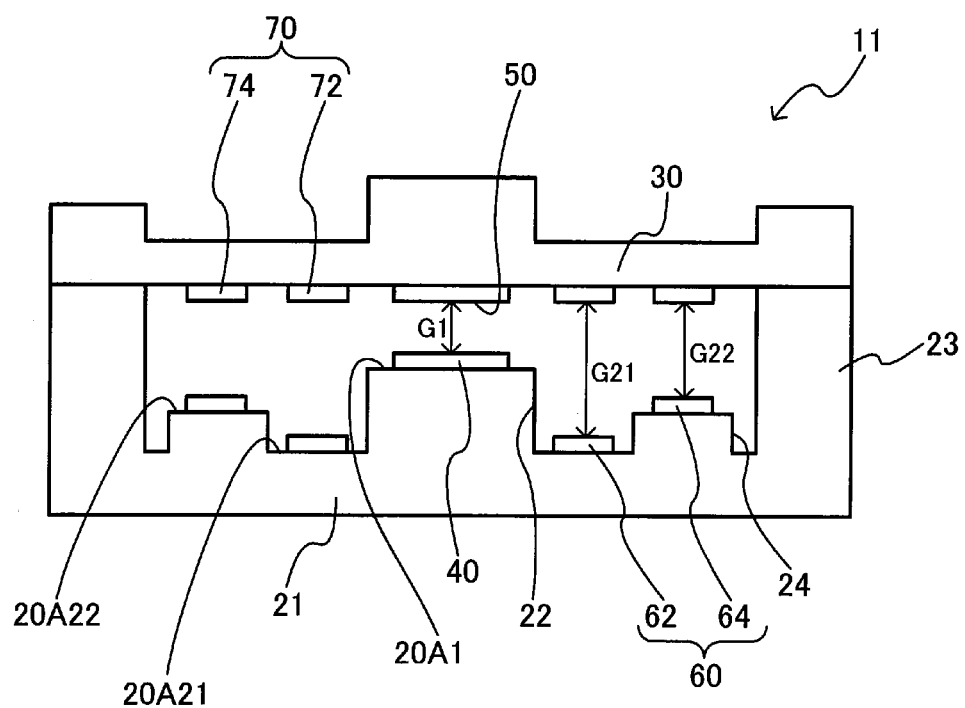
FIG. 19 is a cross-sectional view showing non-voltage application state of an optical filter according to another embodiment of the invention.

FIG. 19 shows an optical filter 11 that is different from the optical filter 10 shown in FIG. 1. In a first substrate 21 shown in FIG. 19, the second surface 20A2 provided with the first electrode 60 in FIG. 1 includes a "2-1" surface 20A21 in the periphery of the first surface 20A1 provided with the first reflecting film in a plan view, and a "2-2" surface 20A22 disposed in the periphery of the 2-1 surface 20A21 in the plan view and having a step 24 with the 2-1 surface 20A21.

The first segment electrode 62 is disposed on the 2-1 surface 20A21, the second segment electrode 64 is disposed on the 2-2 surface 20A22, and an initial value of a gap G22 between the second segment electrode 64 and the second electrode 70 and an initial value of a gap G21 between the first segment electrode 62 and the second electrode 70 are different from each other.

The reason of setting such a relationship as described above is as follows. Among the gaps G21, G22 in the initial state, the gap G22 in the initial state, which is driven first, and corresponds to the second segment electrode 64, for example, is narrowed by the electrostatic attractive force acting between the second segment electrode 64 and the second electrode 70. On this occasion, the gap G21 is also narrowed at the same time to be smaller than the initial gap. Therefore, when starting to drive the first segment electrode 62, the gap G21 is smaller than the initial value.

Here, it is assumed that the 2-1 surface 20A21 and the 2-2 surface 20A22 are coplanar with each other, and the initial values of the gaps G21, G22 are the same. In this case, the gap G22 in the case of first driving the second segment electrode 64, for example, is larger than the gap G21 in the case of driving the first segment electrode 62 later. Therefore, it becomes necessary to set the electrostatic attractive force in the case of first driving the second segment electrode 64 to be excessively stronger than the electrostatic attractive force in the case in which the first segment electrode 62 is driven.

Therefore, in this case, it is preferable that to set the initial value of the gap G22 to be smaller than the initial value of the gap G21 as shown in FIG. 19. It should be noted that in the case of driving the first segment electrode 62 first, it is sufficient to set the initial value of the gap G21 to be smaller than the initial value of the gap G22.

3. ANALYTICAL INSTRUMENT

Figure 20:
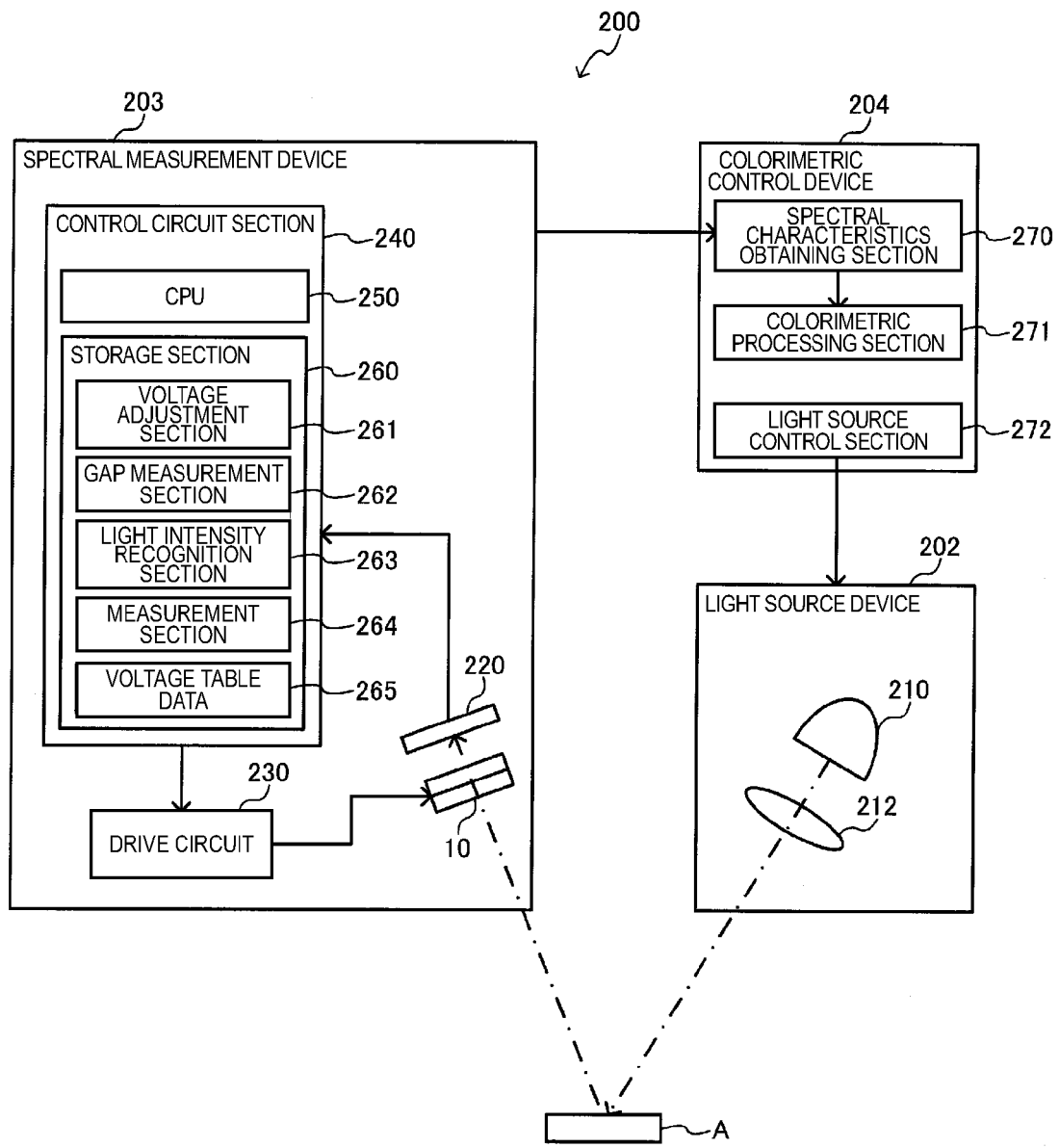
FIG. 20 is a block diagram of an analytical instrument according to still another embodiment of the invention.

FIG. 20 is a block diagram showing a schematic configuration of a colorimeter as an example of an analytical instrument according to an embodiment of the invention.

In FIG. 20, the colorimeter 200 is provided with a light source device 202, a spectral measurement device 203, and a colorimetric control device 204. The colorimeter 200 emits, for example, a white light beam from the light source device 202 toward the test object A, and then input the test target light beam, the light beam reflected by the test object A, to the spectral measurement device 203. Subsequently, the colorimeter 200 disperses the test target light beam with the spectral measurement device 203, and then spectral characteristics measurement for measuring the intensity of each of the light beams with respective wavelengths obtained by the dispersion is performed. In other words, the colorimeter 200 makes the test target light beam as the light beam reflected by the test object A enter the optical filter (an etalon) 10, and then performs the spectral characteristics measurement for measuring the intensity of the light beam transmitted through the etalon 10. Subsequently, the colorimetric control device 204 performs the colorimetric process of the test object A, namely analyzes the wavelengths of the colored light beams included therein, and the proportions of the colored light beams, based on the spectral characteristics thus obtained.

The light source device 202 is provided with a light source 210 and a plurality of lenses 212 (one of the lenses is shown in FIG. 20), and emits a white light beam to the test object A. Further, the plurality of lenses 212 includes a collimator lens, and the light source device 202 modifies the white light beam emitted from the light source 210 into a parallel light beam with the collimator lens, and emits it from the projection lens not shown to the test object A.

As shown in FIG. 20, the spectral measurement device 203 is provided with the etalon 10, a light receiving section 220 as the light receiving section, a drive circuit 230, and a control circuit section 240. Further, the spectral measurement device 203 has an entrance optical lens not shown disposed at a position opposed to the etalon 10, the entrance optical lens guiding the reflected light beam (the test target light beam) reflected by the test object A into the inside thereof.

The light receiving section 220 is composed of a plurality of photoelectric conversion elements, and generates an electric signal corresponding to the received light intensity. Further, the light receiving section 220 is connected to the control circuit section 240, and outputs the electric signal thus generated to the control circuit section 240 as a light reception signal.

The drive circuit 230 is connected to the first electrode 60 and the second electrode 70 of the etalon 10, and the control circuit section 240. The drive circuit 230 applies the drive voltage between the first electrode 60 and the second electrode 70 based on the drive control signal input from the control circuit section 240 to thereby displace the second substrate 30 to a predetermined displacement position. The drive voltage can be applied so that the desired electrical potential difference is caused between the first electrode 60 and the second electrode 70, and for example, it is also possible to apply a predetermined voltage to the first electrode 60 while setting the second electrode 70 to the ground potential. A direct-current voltage is preferably used as the drive voltage.

The control circuit section 240 controls overall operations of the spectral measurement device 203. As shown in FIG. 20, the control circuit section 240 is mainly composed of, for example, a CPU 250 and a storage section 260. Further, the CPU 250 performs a spectral measurement process based on various programs and various data stored in the storage section 260. The storage section 260 is configured including a recording medium such as a memory or a hard disk drive, and stores the various programs and various data so as to be arbitrarily retrieved.

Here, the storage section 260 stores a voltage adjustment section 261, a gap measurement section 262, a light intensity recognition section 263, and a measurement section 264 as a program. It should be noted that as described above the gap measurement section 262 can be omitted.

Further, the storage section 260 stores voltage table data 265 shown in FIG. 8 containing voltage values to be applied to the electrostatic actuators 80, 90 for controlling the spacing of the first gap G1 and the time periods, during which the respective voltage values are applied, in conjunction with each other.

The colorimetric control device 204 is connected to the spectral measurement device 203 and the light source device 202, and performs the control of the light source device 202 and the colorimetric process based on the spectral characteristics obtained by the spectral measurement device 203. As the colorimetric control device 204, a general-purpose personal computer, a handheld terminal, a colorimetric-dedicated computer, and so on can be used.

Further, as shown in FIG. 20, the colorimetric control device 204 is configured including a light source control section 272, a spectral characteristics obtaining section 270, a colorimetric processing section 271, and so on.

The light source control section 272 is connected to the light source device 202. Further, the light source control section 272 outputs a predetermined control signal to the light source device 202 based on, for example, a setting input by the user to thereby make the light source device 202 emit a white light beam with a predetermined brightness.

The spectral characteristic obtaining section 270 is connected to the spectral measurement device 203, and obtains the spectral characteristics input from the spectral measurement device 203.

The colorimetric processing section 271 performs the colorimetric process for measuring the chromaticity of the test object A based on the spectral characteristics. For example, the colorimetric processing section 271 performs a process of making a graph of the spectral characteristics obtained from the spectral measurement device 203, and then outputting it to an output device such as a printer or a display not shown.

Figure 21:
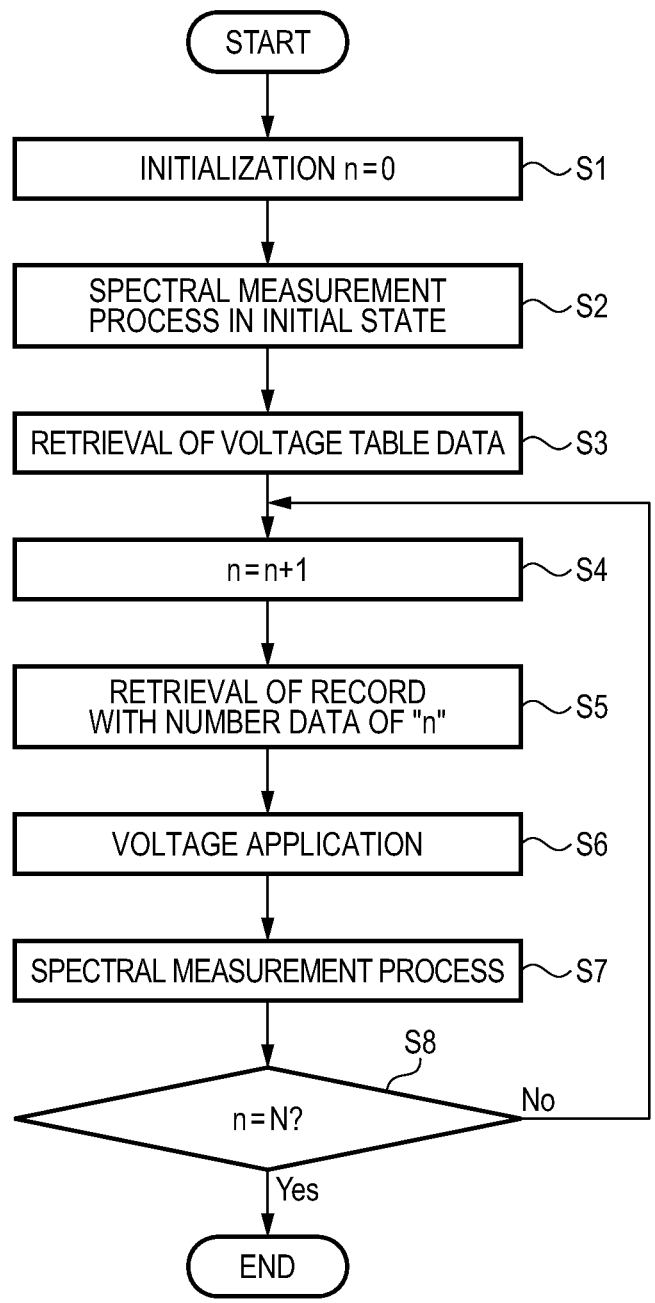
FIG. 21 is a flowchart showing a spectral measurement operation in the instrument shown in FIG. 20.

FIG. 21 is a flowchart showing the spectral measurement operation of the spectral measurement device 203. Firstly, the CPU 250 of the control circuit section 240 starts the voltage adjustment section 261, the light intensity recognition section 263, and the measurement section 264. Further, the CPU 250 initializes a measurement count variable "n" (set n=0) as an initial state (step S1). It should be noted that the measurement count variable n takes an integer value equal to or larger than 0.

Subsequently, the measurement section 264 measures (step S2) the intensity of the light beam transmitted through the etalon 10 in the initial state, namely the state in which no voltage is applied to the electrostatic actuators 80, 90. It should be noted that it is also possible to previously measure the dimension of the first gap G1 in the initial state, for example, at the time of manufacturing of the spectral measurement device and store it in the storage section 260. Then, the measurement section 264 outputs the intensity of the transmitted light beam and the dimension of the first gap G1 in the initial state obtained here to the colorimetric control device 204.

Subsequently, the voltage adjustment section 261 retrieves (step S3) the voltage table data 265 stored in the storage section 260. Further, the voltage adjustment section 261 adds (step S4) "1" to the measurement count variable n.

Subsequently, the voltage adjustment section 261 obtains (step S5) the voltage data of the first and second segment electrodes 62, 64 and the voltage application period data corresponding to the measurement count variable n from the voltage table data 265. Then, the voltage adjustment section 261 outputs the drive control signal to the drive circuit 230 to thereby perform (step S6) the process of driving the electrostatic actuators 80, 90 in accordance with the data of the voltage table data 265.

Further, the measurement section 264 performs (step S7) the spectral measurement process at the application time elapse timing. Specifically, the measurement section 264 makes the light intensity recognition section 263 measure the intensity of the transmitted light. Further, the measurement section 264 performs the control of outputting the spectral measurement result, which includes the intensity of the transmitted light beam thus measured and the wavelength of the transmitted light beam in conjunction with each other, to the colorimetric control device 204. It should be noted that in the measurement of the light intensity, it is also possible to store the data of the light intensity of a plurality of times of measurement or all of the times of the measurement in the storage section 260, and then measure the light intensity of each of the turns of the measurement in a lump after the data of the light intensity of a plurality of times of measurement or all of the data of the light intensity has been obtained.

Subsequently, the CPU 250 determines (step S8) whether or not the measurement count variable n reaches the maximum value N, and if it determines that the measurement count variable n is equal to N, it terminates the series of spectral measurement operation. In contrast, if it is determined in the step S8 that the measurement count variable n is smaller than N, the CPU 250 returns to the step S4 and performs the process of adding "1" to the measurement count variable n, and then repeats the process of the steps S5 through S8.

4. OPTICAL APPARATUS

Figure 22:
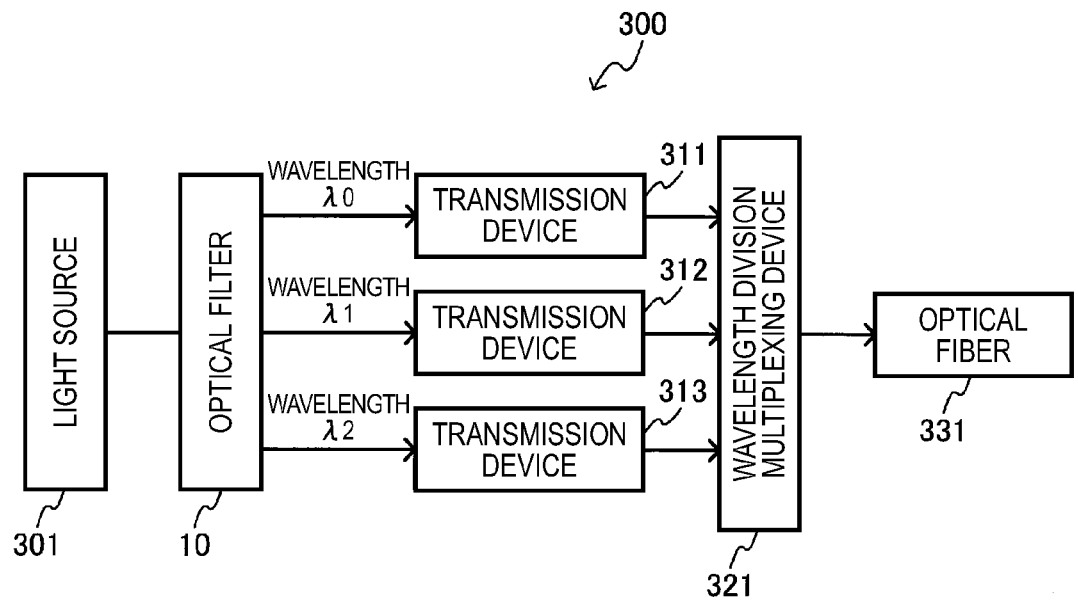
FIG. 22 is a block diagram of an optical apparatus according to still another embodiment of the invention.

FIG. 22 is a block diagram showing a schematic configuration of a transmitter of a wavelength division multiplexing system as an example of an optical apparatus according to an embodiment of the invention. In the wavelength division multiplexing (WDM) communication, using the property of the light that the signals with respective wavelengths different from each other do not interfere each other, by using a plurality of light signals with respective wavelengths different from each other in a single optical fiber in a multiplexed manner, it becomes possible to increase the data transmission quantity without expanding the optical fiber lines.

In FIG. 22, a wavelength division multiplexing transmitter 300 has an optical filter 10 to which a light beam from a light source 301 is input, and a plurality of light beams with respective wavelengths $\lambda 0, \lambda 1, \lambda 2, \ldots$ is transmitted through the optical filter 10. Transmission devices 311, 312, and 313 are provided corresponding to the respective wavelengths. Optical pulse signals corresponding to a plurality of channels output from the transmission devices 311, 312, and 313 are combined by a wavelength division multiplexing device 321 into one signal, and then output to an optical fiber transmission channel 331.

The invention can also be applied to an optical code division multiplexing (OCDM) transmitter in a similar manner. This is because although in the OCDM the channels are discriminated by pattern matching of encoded optical pulse signals, the optical pulses constituting the optical pulse signals include light components with respective wavelengths different from each other.

Although some embodiments are hereinabove explained, it should be understood by those skilled in the art that various modifications not substantially departing from the novel matters and the effects of the invention are possible. Therefore, such modified examples should be included in the scope of the invention. For example, a term described at least once with a different term having a broader sense or the same meaning in the specification or the accompanying drawings can be replaced with the different term in any part of the specification or the accompanying drawings.

Figure 23:
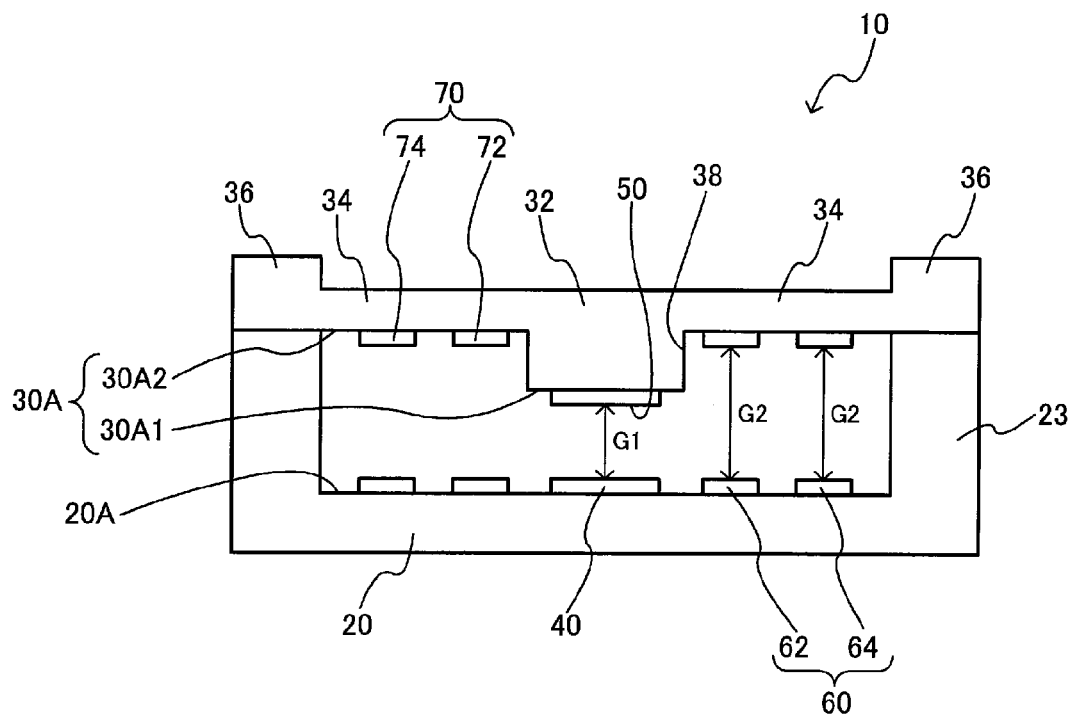
FIG. 23 is a cross-sectional view of an optical filter according to still another embodiment of the invention having the movable substrate provided with a step.

The invention is not limited to the configuration provided with the step only in the first substrate 20, but rather it is possible to provide the step to at least one of the first and second substrates 20, 30. For example, although in FIG. 1 it is assumed that the first substrate provided with the step is the fixed substrate, it is also possible to adopt a configuration in which the first substrate 20 is the movable substrate. FIG. 23 shows another embodiment of the invention providing a step 38 to the second substrate 30 as the movable substrate shown in FIG. 1.

In FIG. 23, the second opposed surface 30A of the second substrate 30 opposed to the first substrate 20 includes the first surface 30A1 provided with the second reflecting film 50 and the second surface 30A2 disposed in the periphery of the first surface 30A1 in the plan view, and provided with the second electrode 70. The first surface 30A1 and the second surface 30A2 are not coplanar with each other, there is the step 38 between the first surface 30A1 and the second surface 30A2, and the first surface 30A1 is placed nearer to the first substrate 20 than the second surface 30A2. Thus, the relationship of (first gap G1)<(second gap G2) becomes true with initial values in the non-voltage application state.

Here, in FIG. 23, if the surface on the opposite side of the second substrate 30 to the second opposed surface 30A is formed as a flat surface, the area provided with the second reflecting film 50 can be made as the thick-wall section 32. In such a manner as described above, the second substrate 30 can be made movable while maintaining the parallelism of the second reflecting film 50.

It should be noted that as described above one of the pair of opposed substrates 20, 30, which is provided with a step, can be called the first substrate, and in FIG. 23, the second substrate 30, the second reflecting film 50, and the second electrode 70 can also be called the first substrate, the first reflecting film, and the first electrode, respectively. Further, in the embodiment shown in FIG. 23, it is also possible to provide the step corresponding to the step 24 shown in FIG. 19 to the second substrate 30, or to both of the first and second substrates 20, 30. On this occasion, it is preferable to also provide the step to the opposite surface of the second substrate 30 to the second opposed surface 30A so as to form the area provided with the second electrode 70 as the thin-wall section 34.

Figure 24:
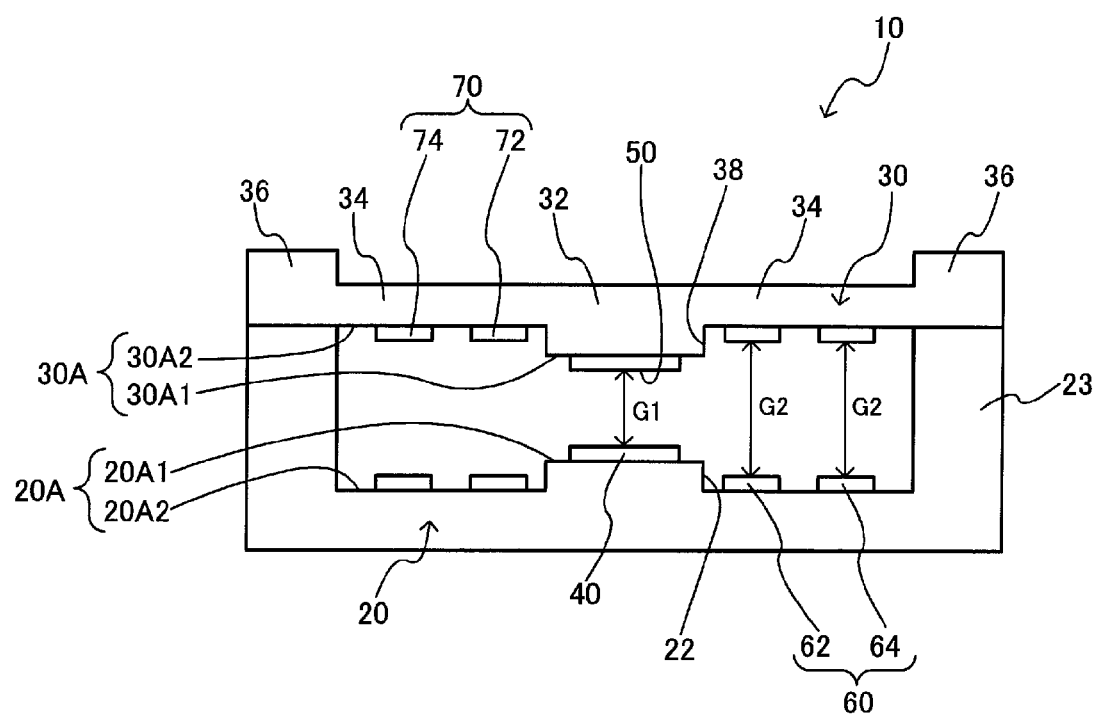
FIG. 24 is a cross-sectional view of an optical filter according to still another embodiment of the invention having both of the first and second substrates each provided with a step.

FIG. 24 shows still another embodiment of the invention in which the steps 22, 38 shown in FIGS. 1 and 23 are provided respectively to the first and second substrates 20, 30. According also to this configuration, the relationship of (first gap G1)<(second gap G2) becomes true with initial values in the non-voltage application state. Also in the embodiment shown in FIG. 24, it is also possible to provide the step corresponding to the step 24 shown in FIG. 19 to the second substrate 30, or to both of the first and second substrates 20, 30.

What is claimed is:
1. An optical filter comprising:
   a first substrate;
   a second substrate that is opposed to the first substrate;
   a first reflecting section that is disposed between the first substrate and the second substrate;
   a second reflecting section that is disposed between the first reflection section and the second substrate, a first gap existing between the first reflecting section and the second reflecting section;

a first electrode that is disposed between the first substrate and the second substrate;

a second electrode that is disposed between the first electrode and the second substrate, a second gap existing between the first electrode and the second electrode; and a third electrode that is disposed between the first substrate and the second electrode, the second gap being larger than the first gap.

2. The optical filter according to claim 1, looking from a direction from the first substrate toward the second substrate, the first electrode and the third electrode being disposed outside of the first reflecting section.

3. The optical filter according to claim 1, the second substrate having a first part and a second part, the second part being disposed so as to surround the first part, the first part having a first thickness, the second part having a second thickness, the first thickness being larger than the second thickness, looking from a direction from the first substrate toward the second substrate, the second reflection section overlapping to the first part, the second electrode overlapping to the second part.

4. An optical filter comprising:

a first substrate;

a second substrate that is opposed to the first substrate;

a first reflecting section that is disposed between the first substrate and the second substrate;

a second reflecting section that is disposed between the first reflection section and the second substrate, a first gap existing between the first reflecting section and the second reflecting section;

a first segment electrode that is disposed between the first substrate and the second substrate;

a first electrode that is disposed between the first segment electrode and the second substrate, a second gap existing between the first segment electrode and the second electrode; and a second segment electrode that is disposed between the first substrate and the second electrode, the second gap being larger than the first gap.

5. The optical filter according to claim 4, looking from a direction from the first substrate toward the second substrate, the first segment electrode and the second segment electrode being disposed outside of the first reflecting section.

6. The optical filter according to claim 4, the second substrate having a first part and a second part, the second part being disposed so as to surround the first part, the first part having a first thickness, the second part having a second thickness, the first thickness being larger than the second thickness, looking from a direction from the first substrate toward the second substrate, the second reflection section overlapping to the first part, the second electrode overlapping to the second part.

7. An optical filter comprising:

a first substrate;

a second substrate that is opposed to the first substrate;

a first reflecting section that is disposed between the first substrate and the second substrate;

a second reflecting section that is disposed between the first reflection section and the second substrate, a first gap existing between the first reflecting section and the second reflecting section; and a first electrode, a second electrode, and a third electrode that is disposed between the first substrate and the second substrate, a second gap existing between the first electrode and the second electrode; and the second gap being larger than the first gap.

8. An analytical instrument comprising the optical filter according to claim 1.

9. An optical apparatus comprising the optical filter according to claim 1.

* * * * *